US012590231B2

(12) United States Patent
Nakamura

(10) Patent No.: US 12,590,231 B2
(45) **Date of Patent: *Mar. 31, 2026**

(54) ADHESIVE COMPOSITION FOR ORGANIC FIBER, ORGANIC FIBER-RUBBER COMPOSITE, AND TIRE

(71) Applicant: BRIDGESTONE CORPORATION, Tokyo (JP)

(72) Inventor: Masaaki Nakamura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 18/257,100

(22) PCT Filed: Sep. 29, 2021

(86) PCT No.: PCT/JP2021/035953

§ 371 (c)(1),
(2) Date: Jun. 13, 2023

(87) PCT Pub. No.: WO2022/137703

PCT Pub. Date: Jun. 30, 2022

(65) Prior Publication Data

US 2024/0117224 A1 Apr. 11, 2024

(30) Foreign Application Priority Data

Dec. 23, 2020 (JP) ................................ 2020-214300

(51) Int. Cl.

*C09J 109/10* (2006.01)
*B60C 1/00* (2006.01)

(Continued)

(52) U.S. Cl.

CPC ............... *C09J 109/10* (2013.01); *B60C 1/00* (2013.01); *C09J 11/06* (2013.01); *C09J 11/08* (2013.01);

(Continued)

(58) Field of Classification Search

CPC . C09J 109/10; C09J 11/06; C09J 11/08; C09J 2301/408; C09J 2400/263; B60C 1/00

See application file for complete search history.

(56) References Cited

U.S. PATENT DOCUMENTS

| | | | |
|---|---|---|---|
| 2,128,229 | A | 8/1938 | William et al. |
| 3,419,452 | A | 12/1968 | Krysiak |

(Continued)

FOREIGN PATENT DOCUMENTS

| | | | |
|---|---|---|---|
| CN | 1643040 | A | 7/2005 |
| CN | 102741336 | A | 10/2012 |

(Continued)

OTHER PUBLICATIONS

Jun. 11, 2024, search result of the Extended European Search Report issued by the European Patent Office in the corresponding European Patent Application No. 21909861.3.

(Continued)

*Primary Examiner* — Jeremy R Pierce
(74) *Attorney, Agent, or Firm* — KENJA IP LAW PC

(57) ABSTRACT

Provided is an adhesive composition for organic fibers that has low burden on the environment, has good operability, and can improve the adhesion between an organic fiber and a coated rubber composition. The adhesive composition for organic fibers contains (A) rubber latex having unsaturated diene, (B) polypeptide, and at least one compound selected from the group consisting of (C) an aqueous compound (Continued)

having a (thermal dissociative blocked) isocyanate group, (D) an epoxide compound, and (E) polyphenol, where no resorcin is contained.

6 Claims, 4 Drawing Sheets

(51) Int. Cl.
*C09J 11/06* (2006.01)
*C09J 11/08* (2006.01)

(52) U.S. Cl.
CPC .... *C09J 2301/408* (2020.08); *C09J 2400/263* (2013.01)

(56) References Cited

U.S. PATENT DOCUMENTS

| | | | |
|---|---|---|---|
| 5,863,987 | A | 1/1999 | Nakamura et al. |
| 6,376,636 | B1 * | 4/2002 | Hansma ................. C09J 171/02 526/201 |
| 8,859,106 | B2 | 10/2014 | Seyffer et al. |
| 9,394,647 | B2 | 7/2016 | Ikeda et al. |
| 10,696,882 | B2 | 6/2020 | Grigsby |
| 2006/0188716 | A1 * | 8/2006 | Takahashi ................ D02G 3/48 428/364 |
| 2012/0302665 | A1 | 11/2012 | Wang et al. |
| 2013/0065012 | A1 | 3/2013 | Parker et al. |
| 2015/0159001 | A1 | 6/2015 | Qu et al. |
| 2017/0130396 | A1 | 5/2017 | Cevahir et al. |
| 2020/0024416 | A1 * | 1/2020 | Holzschuh .......... D06M 15/412 |
| 2020/0208023 | A1 | 7/2020 | Chang et al. |

FOREIGN PATENT DOCUMENTS

| | | | |
|---|---|---|---|
| CN | 106460313 | A | 2/2017 |
| CN | 109196161 | A | 1/2019 |
| JP | H0912997 | A | 1/1997 |
| JP | 2005263887 | A | 9/2005 |
| JP | 2006037251 | A | 2/2006 |
| JP | 2008537701 | A | 9/2008 |
| JP | 2011241402 | A | 12/2011 |
| JP | 2013064037 | A | 4/2013 |
| JP | 5746939 | B2 | 7/2015 |
| JP | 2017502146 | A | 1/2017 |
| JP | 2018076299 | A | 5/2018 |
| WO | 9713818 | A1 | 4/1997 |
| WO | 03062309 | A1 | 7/2003 |
| WO | 2010125992 | A1 | 11/2010 |
| WO | 2018003572 | A1 | 1/2018 |

OTHER PUBLICATIONS

Dec. 7, 2021, International Search Report issued in the International Patent Application No. PCT/JP2021/035953.

Hirokazu Hakata, Rosin Modified Phenolic Resin, Network Polymer, 2010, pp. 248-255, vol. 31, No. 5.

Jun. 13, 2023, International Preliminary Report on Patentability issued in the International Patent Application No. PCT/JP2021/035953.

Jul. 31, 2025, search result of Office Action issued by the China National Intellectual Property Administration in the corresponding Chinese Patent Application No. 202180086483.X.

* cited by examiner

ADHESIVE COMPOSITION FOR ORGANIC FIBER, ORGANIC FIBER-RUBBER COMPOSITE, AND TIRE

TECHNICAL FIELD

This disclosure relates to an adhesive composition for organic fibers, an organic fiber-rubber composite, and a tire.

BACKGROUND

To reinforce a rubber article such as a tire, organic fibers such as tire cords made of nylon fibers, polyester fibers and the like are conventionally adhered to a rubber composition for tires to form an organic fiber-rubber composite. A method of coating organic fibers (especially organic fiber cords) with an adhesive composition for organic fibers, embedding them in a rubber composition for tires, and vulcanizing them together with the rubber composition for tires has been commonly used for the adhesion.

In the process of coating the organic fiber cord with the adhesive composition for organic fibers, a solvent is generally used to adjust the viscosity of the adhesive composition for organic fibers, and it is preferable to use water, which causes little damage to the environment, as the solvent because the solvent evaporates in the process. Further, when coating with the adhesive composition for organic fibers by immersion, it is necessary to reduce the viscosity of the adhesive composition for organic fibers to a low viscosity so that the adhesive composition can be applied by immersion.

Components contained in an aqueous adhesive composition with water-based properties (which is water-soluble or water-dispersible) are generally required to have a polar molecular structure. On the other hand, the polarity of a polymer material such as rubber or an organic fiber base material as an adherend is low, and if the difference between the polarity of the surface of the rubber or organic fiber base material or the like and the polarity of the components contained in the adhesive composition for organic fibers is large, it is difficult to adhere one to the other. Therefore, although the components contained in the aqueous adhesive composition must have polarity due to their water-based properties, the polarity should be controlled so that the adhesiveness will not be deteriorated due to the difference with the polarity of the adherend, so that the aqueous adhesive composition can be used as an adhesive composition for organic fibers. Therefore, an aqueous adhesive composition for organic fibers having functions that simultaneously solve the contradictions is suitably used.

Regarding the process of coating the organic fiber cord with the adhesive composition for organic fibers, an example of the process of immersing the organic fiber cord in the adhesive composition for organic fibers will be described with reference to FIG. 1.

An organic fiber cord 1 is unwound and runs into a dipping bath (dipping tank) 3 containing an adhesive composition 2 for organic fibers, and the organic fiber cord 1 is immersed in the adhesive composition 2 for organic fibers. Next, an organic fiber cord 4 coated with the adhesive composition 2 for organic fibers is withdrawn from the dipping bath (dipping tank) 3, and drawing rollers 5 remove the excess adhesive composition 2 for organic fibers. Further, the organic fiber cord 4 coated with the adhesive composition 2 for organic fibers is subjected to, while being carried by rollers, drying in a drying zone 6, heat curing of the resin with tension applied to stretch the cord in a hot zone 7, heat curing of the resin with the tension accurately adjusted and normalized so as to achieve desired high elongation physical properties in a normalizing zone 8, and air-cooling outside the zones. Then, the organic fiber cord 4 coated with the adhesive composition 2 for organic fibers is wound up. In this way, the organic fiber cord is coated with the adhesive composition for organic fibers.

Conventionally, a RFL (resorcin-formaldehyde-latex) adhesive composition obtained by aging a mixed solution containing resorcin, formaldehyde and rubber latex, or an adhesive composition obtained by mixing a specific adhesion promoter with the RFL adhesive composition has been used as the adhesive composition for organic fibers (see U.S. Pat. No. 2,128,229 Specification (PTL 1), JP 2005-263887 A (PTL 2), JP 2006-37251 A (PTL 3), and JP H09-12997 A (PTL 4)).

As is well known, in the rubber industry, it has been found that an adhesive composition containing a water-dispersible rubber latex component, and an aqueous phenolic resin obtained by mixing and aging water-soluble resorcin and formaldehyde (PTL 1) has a function of achieving both adhesion to rubber, which is an adherend, and adhesion to the surface of a base material with low polarity, such as an organic fiber cord material, and the adhesive composition is widely used in the world. For the adhesion by the RFL adhesive composition, the rubber latex component contained in the RFL adhesive composition adheres to the side of rubber as an adherend by co-vulcanization, and the phenolic resin component, which is a condensate of resorcin and formaldehyde and has adhesiveness to an organic fiber base material, adheres to the side of base material as an adherend.

The reason why resorcin is preferably used is as follows. Resorcin provides a phenolic condensed resin which is a resin-type one having high adhesiveness to an adherend, and at the same time, it can provide a resin component having high adhesiveness to the side of organic fiber base material because a polar functional group introduced into the phenol ring to obtain water solubility is a hydroxyl group that has relatively low polarity and is less likely to cause steric hindrance.

The RFL adhesive composition is obtained by mixing and aging resorcin, formaldehyde, and rubber latex using rosin acid or the like as an emulsifier for polymerization in the presence of a basic composition. It is presumed that, through this process, the water-soluble resorcin and formaldehyde condense in a resol-type condensation reaction in the presence of the base (PTL 2), while addition condensation occurring between the rosin acid on the surface of the latex and a methylol group at the terminal of the resol-type phenol-formaldehyde addition condensation product (Koichi Hakata, Network Polymer, Vol. 31, No. 5, p. 252, (2010) (NPL 1)).

This aging causes the latex to cross-link with the resol-type resorcin-formaldehyde condensate via the rosin acid to enhance the adhesion, and the latex is composited with the aqueous resin to form an encapsulated protective colloid. In the treatment of the adhesive composition by the apparatus as illustrated in FIG. 1 and the like, the rubber adhesiveness of the latex is suppressed, so that the stain due to the adhesion of the adhesive composition to the apparatus is reduced, which is suitably used.

Further, an aqueous (water-dispersible or water-soluble) adhesion promoter has been used as an adhesion promoter to be added to the RFL adhesive composition so that the aqueous adhesive composition improves the adhesion to the surface of a base material with low polarity such as an organic fiber cord material.

(Blocked) isocyanate such as methylene diphenyl diisocyanate with a particle size of 0.01 μm to 0.50 μm (see PTL 3), and water-dispersed particles of water-insoluble phenolic/novolak-type resin such as cresol novolak-type polyfunctional epoxy resin (see PTL 4) and the like have been used as the water-dispersible adhesion promoter.

Further, a sodium hydroxide solution of novolak-type condensate obtained by novolak reaction of resorcin and formaldehyde (see WO 9713818 A1 (PTL 5)), a phenolic resin that dissolves in water in the presence of basic substances such as ammonium solutions of novolak-type condensates of chlorophenols and formaldehyde, or an aqueous urethane compound having a (thermal dissociative blocked) isocyanate group and a self-soluble group (see JP 2011-241402 A (PTL 6)) or the like has been used as the adhesion promoter containing a water-soluble group together with the RFL adhesive composition.

In recent years, however, it has been required to reduce the use of resorcin, which has been used as a water-soluble component in the RFL adhesive composition, from the viewpoint of lowering the burden on the environment.

To respond to the requirement, various adhesive compositions for organic fibers containing no resorcin and using water as a solvent have been studied and proposed.

For example, an adhesive composition containing rubber latex, a blocked isocyanate compound, an epoxide compound, and an amino-based compound as a curing agent (see WO 2010125992 A1 (PTL 7)), or an adhesive composition for organic fibers containing a urethane resin having a (thermal dissociative blocked) isocyanate group, an epoxide compound, a polymer having an oxazoline group, a basic catalyst having a number average molecular weight of 1,000 to 75,000, and rubber latex (see JP 2013-64037 A (PTL 8)) or the like has been disclosed as an adhesive composition for organic fibers containing no resorcin.

CITATION LIST

Patent Literature

PTL 1: U.S. Pat. No. 2,128,229 Specification
PTL 2: JP 2005-263887 A
PTL 3: JP 2006-37251 A
PTL 4: JP H09-12997 A
PTL 5: WO 9713818 A1
PTL 6: JP 2011-241402 A
PTL 7: WO 2010125992 A1
PTL 8: JP 2013-64037 A

Non-Patent Literature

NPL 1: Hirokazu Hakata, Network Polymer, Vol. 31, No. 5, p. 252, (2010)

SUMMARY

Technical Problem

However, when the above-described adhesive compositions for organic fibers containing no resorcin are used, the adhesiveness of the rubber latex, which is measured as the mechanical stability of the adhesive liquid under shear strain, increases. As a result, in the process of coating the organic fiber cord 1 with the adhesive composition 2 for organic fibers and drying and heat curing in FIG. 1, for example, much of the adhesive composition 2 for organic fibers adheres to the drawing rollers 5 and rollers in the drying zone 6 and the like, causing a new problem of poor operability in the process.

Further, the adhesive compositions for organic fibers containing no resorcin as described above have the follows problems:

- there is no cross-linking between the latex component in the coated rubber composition and the condensate of resorcin and formaldehyde in the adhesive composition for organic fibers, so that the adhesiveness is low as compared with conventional RFL adhesive compositions, and
- in the process of coating an organic fiber with the adhesive composition for organic fibers, the adhesive composition is easily adhered to the apparatus as described above, so that the coated surface of the adhesive composition for organic fibers is roughened, and the adhesiveness is lowered.

Furthermore, the adhesive compositions for organic fibers containing no resorcin as described above have a problem that the cord strength of the organic fiber cord coated with the adhesive composition for organic fibers is reduced.

It could thus be helpful to provide an adhesive composition for organic fibers having the following effects:

(1) causing little damage to the environment by using no resorcin, (2) in a process of coating an organic fiber with the adhesive composition for organic fibers and drying and heat curing, it is possible to suppress the adhesion of the adhesive composition for organic fibers to a roller or the like by suppressing the adhesiveness of rubber latex, which is measured as the mechanical stability of the adhesive liquid under shear strain, thereby achieving good operability, and (3) achieving good adhesion between an organic fiber and a coated rubber composition.

It could also be helpful to provide an organic fiber-rubber composite using an organic fiber coated with the adhesive composition for organic fibers, and a tire using the organic fiber-rubber composite.

Solution to Problem

To solve the above problems, we have conducted extensive research on the composition of an adhesive for organic fibers. As a result, we found that an adhesive composition for organic fibers containing (A) rubber latex having unsaturated diene, (B) polypeptide, and at least one of (C) an aqueous compound having a (thermal dissociative blocked) isocyanate group, (D) an epoxide compound, and (E) polyphenol has the following effects (1) causing little damage to the environment by using no resorcin, (2) in a process of coating an organic fiber with the adhesive composition for organic fibers and drying and heat curing, it is possible to suppress the adhesion of the adhesive composition for organic fibers to a roller or the like by suppressing the adhesiveness of rubber latex, which is measured as the mechanical stability of the adhesive liquid under shear strain, thereby achieving good operability, and (3) achieving good adhesion between an organic fiber and a coated rubber composition, and that it is an adhesive composition for organic fibers that solves the above problems, thereby completing the present disclosure.

An adhesive composition for organic fibers of the present disclosure comprises (A) rubber latex having unsaturated diene,
(B) polypeptide, and
at least one compound selected from the group consisting of the following (C) to (E),
(C) an aqueous compound having a (thermal dissociative blocked) isocyanate group,
(D) an epoxide compound, and
(E) polyphenol, wherein
the adhesive composition for organic fibers contains no resorcin.

An organic fiber-rubber composite of the present disclosure uses an organic fiber coated with the adhesive composition for organic fibers.

An organic fiber cord-rubber composite of the present disclosure uses an organic fiber cord coated with the adhesive composition for organic fibers.

A tire of the present disclosure uses the organic fiber-rubber composite (or organic fiber cord-rubber composite).

Advantageous Effect

This disclosure provides an adhesive composition for organic fibers having the following effects:

(1) causing little damage to the environment by using no resorcin,
(2) in a process of coating an organic fiber with the adhesive composition for organic fibers and drying and heat curing, it is possible to suppress the adhesion of the adhesive composition for organic fibers to a roller or the like by suppressing the adhesiveness of rubber latex, which is measured as the mechanical stability of the adhesive liquid under shear strain, thereby achieving good operability, and
(3) achieving good adhesion between an organic fiber and a coated rubber composition.

It also provides an organic fiber-rubber composite using an organic fiber coated with the adhesive composition for organic fibers, and a tire using the organic fiber-rubber composite.

DETAILED DESCRIPTION

Figure 1:
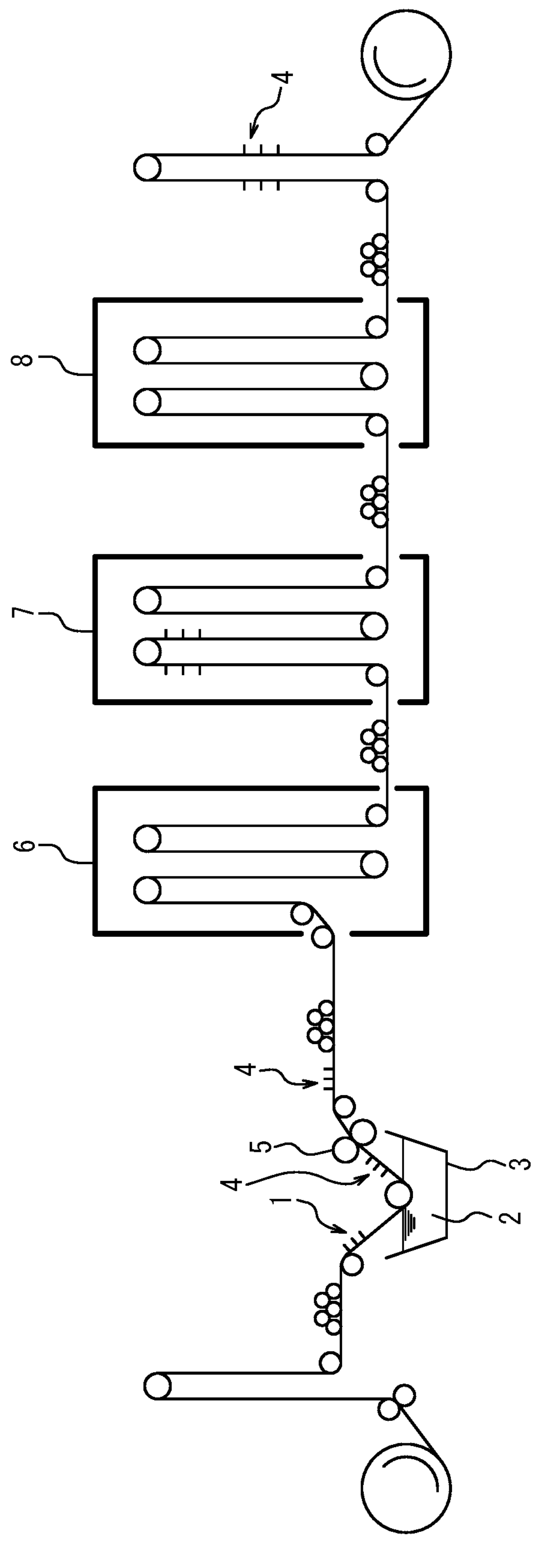
FIG. 1 schematically illustrates an example of a process of coating an organic fiber cord with an adhesive composition for organic fibers by immersion.

The following describes the disclosed adhesive composition for organic fibers, organic fiber-rubber composite, and tire in detail based on their embodiments. These descriptions are for the purpose of exemplifying the present disclosure and do not limit the present disclosure in any way.

In the present specification, the ends of a range are also included in the range unless otherwise specified.

[Adhesive Composition for Organic Fibers]

The adhesive composition for organic fibers of the present disclosure contains (A) rubber latex having unsaturated diene,
(B) polypeptide, and
at least one compound selected from the group consisting of the following (C) to (E),
(C) an aqueous compound having a (thermal dissociative blocked) isocyanate group,
(D) an epoxide compound, and
(E) polyphenol, where
the adhesive composition for organic fibers contains no resorcin.

The adhesive composition for organic fibers of the present disclosure has the following effects:

(1) causing little damage to the environment by using no resorcin,
(2) in a process of coating an organic fiber with the adhesive composition for organic fibers and drying and heat curing, it is possible to suppress the adhesion of the adhesive composition for organic fibers to a roller or the like by suppressing the adhesiveness of rubber latex, which is measured as the mechanical stability of the adhesive liquid under shear strain, thereby achieving good operability, and
(3) achieving good adhesion between an organic fiber and a coated rubber composition.

In the adhesive composition for organic fibers of the present disclosure, the (A) rubber latex having unsaturated diene, and at least one compound selected from the group consisting the (C) aqueous compound having a (thermal dissociative blocked) isocyanate group, the (D) epoxide compound, and (E) polyphenol contribute to improving the adhesion between an organic fiber and a coated rubber composition.

Further, in the adhesive composition for organic fibers of the present disclosure, the (B) polypeptide contributes to improving the operability.

Further, the adhesive composition for organic fibers of the present disclosure can lower the burden on the environment by containing no resorcin.

<Organic Fiber (Especially Organic Fiber Cord)>

The organic fiber (especially organic fiber cord) of the adhesive composition for organic fibers of the present disclosure is used to supplement the strength of a rubber article such as a tire. When the organic fiber cord is used as a reinforcing material, spun organic fiber yarn is first twisted to obtain an organic fiber cord. Then, the organic fiber (especially organic fiber cord) is embedded in rubber that covers the organic fiber (especially organic fiber cord) using an adhesive composition for organic fibers, and vulcanization is performed to adhere them to form an organic fiber-rubber composite (especially organic fiber cord-rubber composite). The organic fiber-rubber composite can be used as a reinforcing member of a rubber article such as a tire.

The material of the organic fiber cord is not particularly limited, and fiber materials typified by aliphatic polyamide fiber cords such as polyester, 6-nylon, 6,6-nylon and 4,6- nylon, protein fiber cords such as artificial fibroin fiber, polyketone fiber cords, aromatic polyamide fiber cords typified by polynonamethylene terephthalamide and para-phenylene terephthalamide, acrylic fiber cords, carbon fiber cords, and cellulose fiber cords such as rayon and lyocell can be used. Among the above, it is preferable to use polyester, 6-nylon, and 6,6-nylon, and it is particularly preferable to use polyester.

The material of the polyester is a polymer having an ester bond in the main chain, and more specifically, it is one where 80% or more of the bonding mode of the repeating units in the main chain is an ester bonding mode.

The polyester is not particularly limited, and examples thereof include those obtained by condensation of glycols, such as ethylene glycol, propylene glycol, butylene glycol, methoxypolyethylene glycol and pentaerythritol, and dicarboxylic acids, such as terephthalic acid, isophthalic acid and their dimethyls, by an esterification reaction or a transesterification reaction. The most typical polyester is polyethylene terephthalate.

The organic fiber cord is preferably an organic fiber cord obtained by twisting a plurality of single fiber filaments, particularly for the purpose of reinforcing a rubber article such as a tire article or a conveyor belt. Further, the organic fiber cord is preferably an organic fiber cord obtained by twisting second twisted single fiber filaments and first twisted single fiber filaments. In this case, it is more preferable that the twist constant of the first twist should be 1,300 or more and 2,500 or less, and/or the twist constant of the second twist should be 900 or more and 1,800 or less.

<(A) Rubber Latex Having Unsaturated Diene>

The "(A) latex having unsaturated diene" in the adhesive composition for organic fibers of the present disclosure is rubber latex containing unsaturated diene that is vulcanizable with sulfur.

An example of the principle of action exhibited by the "(A) rubber latex having unsaturated diene" contained in the adhesive composition for organic fibers in an embodiment of the present disclosure will be described with reference to FIGS. 2 and 3. Rubber latex 11 having unsaturated diene is a component for adhering an adhesive layer 32 of an adhesive composition 2 for organic fibers and a coated rubber composition 33 as an adherend. The rubber latex 11 having unsaturated diene is compatible with rubber polymer contained in the coated rubber composition 33 which is the adherend, and the unsaturated diene moiety is co-vulcanized to form a rubber co-vulcanized adhesive 21. As a result, the adhesive composition for organic fibers of the present disclosure containing the "(A) rubber latex having unsaturated diene" obtains good adhesion between an organic fiber and a coated rubber composition.

The (A) latex having unsaturated diene is not limited, and examples thereof include "synthetic rubber latex having unsaturated diene" such as styrene-butadiene copolymer rubber latex, vinylpyridine-styrene-butadiene copolymer rubber latex, carboxyl group modified styrene-butadiene copolymer rubber latex, nitrile rubber latex, and chloroprene rubber latex; and natural rubber latex such as field latex, ammonia-treated latex, and deproteinized latex. These may be used alone or in combination of two or more.

Among the above, vinylpyridine-styrene-butadiene copolymer rubber latex is preferable. The reason is as follows. Vinylpyridine-styrene-butadiene copolymer rubber latex is rubber latex that has been widely used in adhesive compositions for organic fibers and articles such as tires. It also provides good adhesion between the adhesive layer and the adhered rubber in the adhesive composition for organic fibers of the present disclosure, and its advantage of being relatively flexible also allows the organic fiber to deform without splitting the adhesive layer.

In the adhesive composition for organic fibers of the present disclosure, the content (solid content) of the (A) rubber latex having unsaturated diene is not particularly limited. However, the lower limit is preferably 25% by mass or more, more preferably 30% by mass or more, and still more preferably 40% by mass or more. The upper limit is preferably 80% by mass or less, more preferably 70% by mass or less, and still more preferably 65% by mass or less. The reason is as follows. When the content is 25% by mass or more, it provides more appropriate compatibility between rubber polymers of the adhered rubber composition and the rubber latex contained in the adhesive composition for organic fibers, thereby improving the adhesion state of the coated rubber in an organic fiber-rubber composite. Further, when the content is 80% by mass or less, it is possible to relatively secure a certain amount or more of resin component contained as another component in the adhesive composition. As a result, sufficient cohesive failure resistance of the adhesive layer is secured, and fracture inside the adhesive layer is less likely to occur, thereby obtaining sufficient adhesiveness.

The synthetic rubber latex having unsaturated diene can be obtained as follows, for example. After dissolving an emulsifier such as potassium rosin in water, the monomer mixture is added thereto. Further, an electrolyte such as sodium phosphate and peroxides and the like are added as an initiator to perform the polymerization. Then, after reaching a predetermined conversion rate, a charge transfer agent is added to terminate the polymerization, and the residual monomer is removed. It is preferable to use a chain transfer agent in the polymerization.

The emulsifier uses one or more of anionic surfactants such as alkali metal salts of fatty acids, alkali metal salts of rosin acids, sodium formaldehyde condensed naphthalene sulfonate, sulfate esters of higher alcohols, alkylbenzene sulfonates and aliphatic sulfonates, or nonionic surfactants such as alkyl ester type, alkyl ether type, or alkyl phenyl ether type of polyethylene glycol.

Among these emulsifiers, it is preferable to contain a metal salt of rosin acid, and it can be used alone (only one type), or it can be used in combination of two or more with other emulsifiers.

In the production of the synthetic rubber latex having unsaturated diene in the EXAMPLES section of the present disclosure, an alkali metal salt of rosin acid was used alone as the emulsifier.

Rosin acid is a mixture of resin acids having a similar chemical structure, mainly composed of tricyclic diterpenes obtained from pine resin and the like. These resin acids have three ring structures, two double bonds, and one carboxyl group, and they have functional groups with high reactivity, such as the double bond portion reacting with unsaturated carboxylic acids, or esterification at the methylol end of resol phenolic resin and the carboxyl group portion.

The amount of the emulsifier used is 0.1 parts by mass to 8 parts by mass and preferably 1 part by mass to 5 parts by mass with respect to 100 parts by mass of all the monomers usually used for latex polymerization.

For example, a water-soluble initiator such as potassium persulfate, sodium persulfate and ammonium persulfate, a redox-based initiator, or an oil-soluble initiator such as benzoyl peroxide can be used as the polymerization initiator.

In the production of the synthetic rubber latex having unsaturated diene in the EXAMPLES section of the present disclosure, potassium persulfate was used as a polymerization initiator.

Examples of the chain transfer agent include monofunctional alkyl mercaptans such as n-hexyl mercaptan, t-dodecyl mercaptan, n-dodecyl mercaptan, n-octyl mercaptan, n-tetradecyl mercaptan, and t-hexyl mercaptan; bifunctional mercaptans such as 1,10-decanedithiol and ethylene glycol dithioglycolate; trifunctional mercaptans such as 1,5,10-canditrithiol, and trimethylolpropane tristhioglycolate; tetrafunctional mercaptans such as pentaerythritol tetrakisthioglycolate; disulfides; halide compounds such as carbon tetrachloride, carbon tetrabromide, and ethylene bromide; $\alpha$-methylstyrene dimer, terpineol, $\alpha$-terpinene, dipentene, and allyl alcohol. These may be used alone or in combination of two or more.

Among these chain transfer agents, alkyl mercaptan is preferable, and n-octyl mercaptan and t-dodecyl mercaptan are more preferable.

In the production of the synthetic rubber latex having unsaturated diene in the EXAMPLES section of the present disclosure, t-dodecyl mercaptan was used as a chain transfer agent.

The amount of the chain transfer agent used is 0.01 parts by mass to 5 parts by mass and preferably 0.1 parts by mass to 3 parts by mass with respect to 100 parts by mass of all the monomers usually used for latex polymerization.

In addition to the above, the latex may contain additives such as age resistors such as hindered phenols, silicon-based, higher alcohol-based or mineral oil-based defoaming agents, reaction terminators, and antifreezing agents, if necessary.

<<Vinylpyridine-Styrene-Butadiene Copolymer Rubber Latex>>

The vinylpyridine-styrene-butadiene copolymer rubber latex is generally a ternary copolymer of a vinylpyridine-based monomer, a styrene-based monomer, and a conjugated diene-based butadiene monomer, but these monomers may be added with other copolymerizable monomers.

As used herein, the vinylpyridine-based monomer includes vinylpyridine and substituted vinylpyridine in which a hydrogen atom in the vinylpyridine is substituted with a substituent. Examples of the vinylpyridine-based compound include 2-vinylpyridine, 3-vinylpyridine, 4-vinylpyridine, 2-methyl-5-vinylpyridine, and 5-ethyl-2-vinylpyridine, among which 2-vinylpyridine is preferable. These vinylpyridine-based monomers may be used alone or in combination of two or more.

The styrene-based monomer includes styrene and substituted styrene in which a hydrogen atom in the styrene is substituted with a substituent. Examples of the styrene-based monomer include styrene, $\alpha$-methylstyrene, 2-methylstyrene, 3-methylstyrene, 4-methylstyrene, 2,4-diinopropylstyrene, 2,4-dimethylstyrene, 4-t-butylstyrene, and hydroxymethylstyrene, among which styrene is preferable. These styrene-based monomers may be used alone or in combination of two or more.

Examples of the conjugated diene-based butadiene monomer include aliphatic conjugated butadiene compounds such as 1,3-butadiene and 2-methyl-1,3-butadiene, among which 1,3-butadiene is preferable. These conjugated diene-based butadiene monomers may be used alone or in combination of two or more.

A known method can be used for the synthesis of the vinylpyridine-styrene-butadiene copolymer rubber latex, and specifically, the method described in JP H09-78045 A that has been examined by us can be used. With these methods, it is possible to have various compositions and intra-particle structures such as copolymers with uniform or different composition ratios within one particle of the vinylpyridine-styrene-butadiene copolymer rubber latex.

Regarding the vinylpyridine-styrene-butadiene copolymer rubber latex, examples of commercially-available products of the copolymer with a uniform composition monomer mixture ratio in one particle include Nipol 2518 manufactured by Nippon Zeon Corporation and PYRATEX manufactured by NIPPON A&L INC., and examples of commercially-available products of the copolymer with different composition monomer mixture ratios in one particle include V0658 products manufactured by JSR Corporation. All of these can be used as the (A) rubber latex having unsaturated diene in the adhesive composition for organic fibers of the present disclosure.

In the vinylpyridine-styrene-butadiene copolymer rubber latex, the monomer ratio of vinylpyridine:styrene:butadiene is not particularly limited. However, it is preferable to contain a copolymer obtained by polymerizing a monomer mixture composed of 5% by mass to 20% by mass of vinylpyridine, 10% by mass to 40% by mass of styrene, and 45% by mass to 75% by mass of butadiene in the copolymer constituting the vinylpyridine-styrene-butadiene copolymer particles. The reason is as follows. When the content of vinylpyridine is 5% by mass or more, there is an appropriate amount of pyridine moiety, which has a vulcanization promoting effect, in the rubber component, and the adhesiveness of the entire adhesive layer further improves as the degree of cross-linking is increased by sulfur. When the content of vinylpyridine is 20% by mass or less, it is possible to obtain a hard adhesive without the degree of cross-linking of the rubber being overvulcanized. When the content of styrene is 10% by mass or more, the strength of the latex particles and the adhesive layer is sufficient, and the adhesiveness is further improved. When the content of styrene is 40% by mass or less, the adhesiveness is ensured with appropriate co-vulcanization properties between the adhesive layer and the adhered rubber. When the content of butadiene is 45% by mass or more, it is possible to form cross-links more sufficiently. When the content of butadiene is 75% by mass or less, durability in terms of volume and modulus change can be ensured satisfactorily with moderate cross-linking.

In the synthetic rubber latex having unsaturated diene in the EXAMPLES section of the present disclosure, the composition ratio of the monomer mixture of vinylpyridine:styrene:butadiene was set to 15:15:70.

<(B) Polypeptide>

The "(B) polypeptide" in the adhesive composition for organic fibers of the present disclosure is a molecule in which amino acids are used as monomers and connected in a chain (short chain) by peptide bonds. Examples of the polypeptide include those obtained by hydrolysis of proteins (of wool, milk, beans, silk, fish scales, and skins). Derivatives such as those in which the N-terminus of the polypeptide is converted to quaternary ammonium are also included.

In one embodiment of the present disclosure, an example of the principle of action exhibited by the "(B) polypeptide" contained in the adhesive composition for organic fibers of the present disclosure will be described with reference to FIGS. 2 and 3.

In a conventional adhesive composition for organic fibers containing resorcin and formaldehyde, the resorcin and formaldehyde form a resol-type resorcin-formaldehyde condensate between rubber latex particles dispersed in an aqueous solvent, and a methylol group of the resol-type resorcin-formaldehyde condensate is added to a rosinate used as an emulsifier and co-condensed on the surface of rubber latex in the adhesive composition for organic fibers. The adhesiveness of the rubber latex is suppressed by coating by the chemical cross-linking of the phenolic resin formed thereby.

On the other hand, in the adhesive composition for organic fibers of the present disclosure, polypeptide molecules of polypeptide 12 form a network in water below the gelation temperature to cover the surface of the rubber latex 11 (core) having unsaturated diene. The rubber latex 11 having unsaturated diene has a negative (−) charge on the surface due to emulsified rosinate, carboxylic acid of unsaturated fatty acid and the like, to which cationic groups such as amino groups ($—NH_2$) and (if included) thiol groups (—SH) of the molecules of the polypeptide 12 are adsorbed by electrostatic attraction to form a composite. This covering suppresses the adhesiveness of the rubber latex 11 having unsaturated diene (latex-polypeptide protective film effect 20).

As a result, the adhesive composition for organic fibers of the present disclosure containing the "(B) polypeptide" can suppress the adhesion of the adhesive composition for organic fibers to a roller or the like by suppressing the adhesiveness of rubber latex, which is measured as the mechanical stability of the adhesive liquid under shear strain in a process of coating an organic fiber with the adhesive composition for organic fibers and drying and heat curing, thereby achieving good operability.

Further, the polypeptide 12 of the adhesive composition 2 for organic fibers of the present disclosure coated on the surface of the organic fiber cord 1 is chemically cross-linked with the highly reactive carboxylic acid moiety of rosin acid by an amide bond or an ester bond through heat treatment, thereby achieving good adhesion between an organic fiber and a coated rubber composition.

Further, when the adhesive composition for organic fibers of the present disclosure contains (C) an aqueous compound having a (thermal dissociative blocked) isocyanate group, the amino group ($—NH_2$), hydroxyl group (—OH), thiol group (—SH) and the like of the polypeptide 12 form a polypeptide-isocyanate cross-link 22 with an activated isocyanate group 14 of a urethane resin 13 formed by the aqueous compound having a (thermal dissociative blocked) isocyanate group through high-temperature heat treatment after drying. As a result, the adhesive composition containing the "(B) polypeptide" and the "(C) aqueous compound having a (thermal dissociative blocked) isocyanate group" provides better adhesion between an organic fiber and a coated rubber composition.

In the adhesive composition for organic fibers of the present disclosure, the (B) polypeptide is preferably polypeptide obtained by hydrolysis of proteins. The polypeptide obtained by hydrolysis of proteins is not particularly limited, and examples thereof include protein hydrolysates obtained by hydrolysis (or partial hydrolysis) of proteins with acid or alkali. Examples of protein that serves as the protein source of the protein hydrolysates include those derived from animals such as wool, milk, silk (silk fibroin), fish scales, and skins (pig skin, etc.), and those derived from plants such as beans (soybeans, almonds, etc.).

In the adhesive composition for organic fibers of the present disclosure, the (B) polypeptide, although not particularly specified, preferably has a number average molecular weight of 100 to 20,000, more preferably has a number average molecular weight of 200 to 15,000, and still more preferably has a number average molecular weight of 300 to 8,000. As the number average molecular weight increases, the effect of improving adhesion increases, and as the number average molecular weight decreases, the stability in the adhesive composition improves. Within the above ranges, both the adhesion and the stability in the adhesive composition can be achieved. When the number average molecular weight of the polypeptide is 300 to 8,000, the adhesion between an organic fiber and a coated rubber composition is improved.

A commercially available polypeptide can be used as the (B) polypeptide in the adhesive composition for organic fibers of the present disclosure. The polypeptide may be used alone or in combination of two or more.

In the adhesive composition for organic fibers of the present disclosure, the content (solid content) of the (B) polypeptide is not particularly limited. However, it is preferably 0.1% by mass or more and more preferably 0.3% by mass or more. Further, it is preferably 15% by mass or less, more preferably 10% by mass or less, and still more preferably 5% by mass or less. The reason is as follows. When the content is 0.1% by mass or more, there is an advantage that the adhesion of the adhesive composition for organic fibers to a roller or the like can be further suppressed, which improves the operability. When the content is 15% by mass or less, there will not be too much polypeptide contained in the adhesive layer, and the fracture resistance of the adhesive layer can be sufficiently secured.

<(C), (D) and (E)>

The adhesive composition for organic fibers of the present disclosure contains at least one compound selected from the group consisting of (C) an aqueous compound having a (thermal dissociative blocked) isocyanate group, (D) an epoxide compound, and (E) polyphenol.

In the adhesive composition for organic fibers of the present disclosure, the (C) aqueous compound having a (thermal dissociative blocked) isocyanate group and the (D) epoxide compound function as cross-linking agents and contribute to improving the adhesion between an organic fiber and a coated rubber composition.

On the other hand, the (E) polyphenol has the function of improving the affinity between the adhesive composition and the surface of an organic fiber. As a result, the adhesion between an organic fiber and a coated rubber composition can be improved.

Therefore, the (C) aqueous compound having a (thermal dissociative blocked) isocyanate group, the (D) epoxide compound, and the (E) polyphenol all contribute to improving the adhesion between an organic fiber and a coated rubber composition.

<(C) Aqueous Compound Having a (Thermal Dissociative Blocked) Isocyanate Group>

The "(thermal dissociative blocked) isocyanate group" of the "(C) aqueous compound having a (thermal dissociative blocked) isocyanate group" means a thermal dissociative blocked isocyanate group or isocyanate group, including (i) a thermal dissociative blocked isocyanate group formed by the reaction of an isocyanate group with a thermal dissociative blocking agent for the isocyanate group, (ii) an isocyanate group where the isocyanate group has not reacted with a thermal dissociative blocking agent for the isocyanate group, (iii) an isocyanate group formed by dissociation of a thermal dissociative blocking agent from a thermal dissociative blocked isocyanate group, and (iv) an isocyanate group.

The "aqueous" of the "(C) aqueous compound having a (thermal dissociative blocked) isocyanate group" indicates that it is water-soluble or water-dispersible. The "water-soluble" does not necessarily mean completely water-soluble, but also means that it is partially water-soluble, and it also means that phase separation will not occur in the aqueous solution of the adhesive composition for organic fibers.

The "(C) aqueous compound having a (thermal dissociative blocked) isocyanate group" is preferably (C-1) a water-dispersible (thermal dissociative blocked) isocyanate compound that is an addition product of polyisocyanate having an aromatic ring and a blocking agent having one or more active hydrogen groups. This case provides better adhesion between an organic fiber and a coated rubber composition.

For the "(C-1) water-dispersible (thermal dissociative blocked) isocyanate compound that is an addition product of polyisocyanate having an aromatic ring and a blocking agent having one or more active hydrogen groups", the "active hydrogen group" refers to a group containing hydrogen that becomes active hydrogen (atomic hydrogen (hydrogen radical) and hydride ion (hydride)) when placed under suitable conditions. Examples of the active hydrogen group include an amino group and a hydroxyl group.

The thermal dissociative blocking agent is not particularly limited if it is a blocking agent compound that protects the isocyanate group from any chemical reaction where the blocking agent can be dissociated by heat treatment as necessary to restore the isocyanate group. Specifically, it is preferably a thermal dissociation temperature at which the cross-linking reactivity of the isocyanate group, which is blocked by the thermal dissociative blocking agent and suppressed, can be recovered at the temperature of the heat treatment for heat curing after coating and drying the adhesive liquid in the process illustrated in FIG. 1.

Examples of the blocking agent include alcohol, phenol, active methylene, oxime, lactam, and amine. Specific examples thereof include, but are not limited to, lactams such as ε-caprolactam, δ-valerolactam, and γ-butyrolactam; phenols such as phenol, cresol, ethylphenol, butylphenol, octylphenol, nonylphenol, dinonylphenol, thiophenol, chlorphenol, and amylphenol; oximes such as methylethylketoxime, acetone oxime, acetophenone oxime, benzophenone oxime, and cyclohexanone oxime; alcohols such as methanol, ethanol, butanol, isopropyl alcohol, butyl alcohol, and cyclohexanol; malonic acid dialkyl esters such as dimethyl malonate and diethyl malonate; active methylenes such as methyl acetoacetate, ethyl acetoacetate, and acetylacetone, mercaptans such as butyl mercaptan and dodecyl mercaptan; amides such as acetanilide and acetic acid amide; imides such as succinimide, phthalic acid imide, and maleic acid imide; sulfites such as sodium bisulfite; cellosolves such as methyl cellosolve, ethyl cellosolve and butyl cellosolve; pyrazoles such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; amines such as dimethylamine, diethylamine, di-n-propylamine, diisopropylamine, dicyclohexylamine, diphenylamine, xylidine, N,N-diethylhydroxyamine, N,N'-diphenylformamidine, 2-hydroxypyridine, 3-hydroxypyridine, and 2-mercaptopyridine; and triazoles such as 1,2,4-triazole. A mixture of two or more of these may be used.

The blocking agent is preferably phenol, ε-caprolactam and ketoxime, which facilitates to obtain stable heat curing of the adhesive composition by thermal dissociation by heating.

Specifically, the "(C-1) water-dispersible (thermal dissociative blocked) isocyanate compound that is an addition product of polyisocyanate having an aromatic ring and a blocking agent having one or more active hydrogen groups" includes aromatic polyisocyanates or aromatic aliphatic polyisocyanates. Examples of the aromatic isocyanates include phenylene diisocyanates such as m-phenylene diisocyanate and p-phenylene diisocyanate; tolylene diisocyanates such as 2,4-tolylene diisocyanate and 2,6-tolylene diisocyanate (TDI); diphenylmethane diisocyanates such as 2,4'-diphenylmethane diisocyanate, 4,4'-diphenylmethane diisocyanate (MDI), dialkyldiphenylmethane diisocyanate, and tetraalkyldiphenylmethane diisocyanate; polymethylene polyphenyl polyisocyanate (polymeric MDI); m- or p-isocyanatophenylsulfonyl isocyanates; diisocyanatobiphenyls such as 4,4'-diisocyanatobiphenyl and 3,3'-dimethyl-4,4'-diisocyanatobiphenyl; and naphthalene diisocyanates such as 1,5-naphthylene diisocyanate. Examples of the aromatic aliphatic polyisocyanates include xylylene diisocyanates such as m-xylylene diisocyanate, p-xylylene diisocyanate (XDI), and tetramethylxylylene diisocyanate; diethylbenzene diisocyanate; and α,α,α,α-tetramethylxylylene diisocyanate (TMXDI). Modified products such as carbodiimide, polyol and allophanate of the polyisocyanates are also included.

Among these polyisocyanates containing an aromatic ring in the molecule, aromatic isocyanate is preferable, tolylene diisocyanate (TDI), diphenylmethane diisocyanate (MDI) or polymethylene polyphenyl polyisocyanate (polymeric MDI) are more preferable, and diphenylmethane diisocyanate (MDI) is particularly preferable, from the viewpoint of the cord focusing properties of the adhesive composition.

The (C-1) water-dispersible (thermal dissociative blocked) isocyanate compound that is an addition product of polyisocyanate having an aromatic ring and a blocking agent having one or more active hydrogen groups is preferably a block body of methylene diphenyl diisocyanate (also called "diphenylmethane diisocyanate"). This case provides better adhesion between an organic fiber and a coated rubber composition.

Further, the "(C) aqueous compound having a (thermal dissociative blocked) isocyanate group" is more preferably (C-2) an aqueous urethane compound having a (thermal dissociative blocked) isocyanate group. This case also provides better adhesion between an organic fiber and a coated rubber composition.

The details of the (C-2) aqueous urethane compound having a (thermal dissociative blocked) isocyanate group will be described later.

The content (solid content) of the (C) aqueous compound having a (thermal dissociative blocked) isocyanate group is not particularly limited. However, it is preferably 5% by mass or more, more preferably 10% by mass or more, and still more preferably 20% by mass or more. Further, it is preferably 75% by mass or less, more preferably 60% by mass or less, and still more preferably 50% by mass or less. The reason is as follows. When the content is 5% by mass or more, the adhesion between an organic fiber and a coated rubber composition can be improved. When the content is 75% by mass or less, it is possible to relatively secure a certain amount or more of other components such as rubber latex blended in the adhesive composition for organic fibers, which improves the adhesiveness to rubber as an adherend.

In a conventional adhesive composition for organic fibers containing resorcin and formaldehyde, a sea-island structure is formed in which rubber latex particles (like islands) are dispersed in a phenolic resin (like the sea) in which the resorcin and formaldehyde are co-condensed, thereby obtaining good adhesion between the phenolic resin covering the surface of an organic fiber and the organic fiber.

On the other hand, in one preferred embodiment of the adhesive composition for organic fibers of the present disclosure, the "(C) aqueous compound having a (thermal dissociative blocked) isocyanate group" may act as an adhesion promoter because of the following two functional effects, instead of the phenolic resin in which the resorcin and formaldehyde are co-condensed:

(a) a functional effect where the aqueous compound is distributed at a position near the interface between an organic fiber and an adhesive layer of the adhesive composition for organic fibers, so that the adhesion between the organic fiber and the adhesive layer is promoted, and (b) a functional effect where in the adhesive layer of the adhesive composition for organic fibers, a three-dimensional network structure is formed by cross-linking of the isocyanate group by the compound having a (thermal dissociative blocked) isocyanate group, so that the adhesive layer is reinforced.

As a result, in the adhesive composition for organic fibers, the "(C) aqueous compound having a (thermal dissociative blocked) isocyanate group" contributes to good adhesion between an organic fiber cord and a coated rubber composition.

An example of the principles of the above-described (a) and (b), which are the two functional effects of the "(C) aqueous urethane compound having a (thermal dissociative blocked) isocyanate group" as an adhesion promoter, in one embodiment of the adhesive composition for organic fibers of the present disclosure will be described in detail with reference to FIG. 2 in a case where the "(C) aqueous urethane compound having a (thermal dissociative blocked) isocyanate group" is (C-1) a water-dispersible (thermal dissociative blocked) isocyanate compound that is an addition product of polyisocyanate having an aromatic ring and a blocking agent having one or more active hydrogen groups, and with reference to FIG. 3 in a case where the "(C) aqueous urethane compound having a (thermal dissociative blocked) isocyanate group" is (C-2) an aqueous urethane compound having a (thermal dissociative blocked) isocyanate group.

<<Regarding the Functional Effect of (a) as an Adhesion Promoter>>

A polyester synthetic resin material such as polyethylene terephthalate, which is widely used as an organic fiber, contains a flat linear polymer chain. The surface of the polymer chain or the gaps of the polymer chain has a π-electron atmosphere derived from the aromatics and the like contained in the polymer chain. Further, polyester has a particularly small number of hydroxyl groups on the surface as compared with 6,6-nylon. Therefore, conventionally, an adhesive composition for organic fibers used for an organic fiber made of polyester has contained molecules having a planar structure having an aromatic ring with aromatic π electrons on the side surface ("a part that easily diffuse into the organic fiber") as an adhesion promoter for the purposes that the adhesive composition for organic fibers is dispersed into the gaps of the polymer chain of an organic fiber, and an adhesive layer of the adhesive composition for organic fibers adheres to the surface of the polymer chain of the organic fiber to obtain sufficient adhesiveness.

The "(C-1) water-dispersible (thermal dissociative blocked) isocyanate compound that is an addition product of polyisocyanate having an aromatic ring and a blocking agent having one or more active hydrogen groups" has been used as a specific example of such an adhesion promoter.

The "(C-1) water-dispersible (thermal dissociative blocked) isocyanate compound that is an addition product of polyisocyanate having an aromatic ring and a blocking agent having one or more active hydrogen groups" is preferably (blocked) isocyanate (see PTL 3) such as methylene diphenyl diisocyanate having a particle size of 0.01 μm to 0.50 μm.

Figure 2:
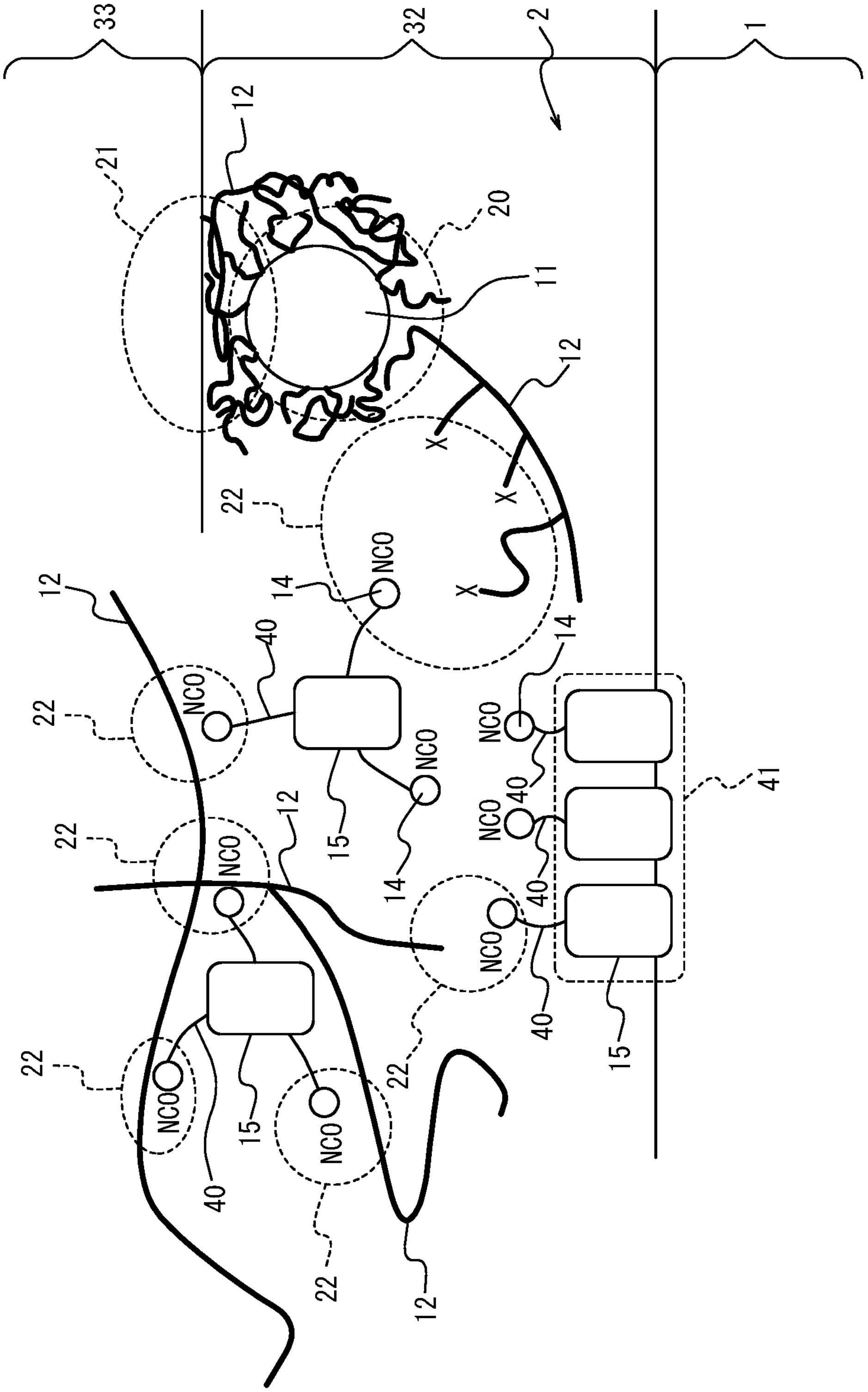
FIG. 2 schematically illustrates an example of the principle where the adhesive composition for organic fibers of the present disclosure suppresses the adhesiveness of rubber latex and improves the adhesion between an organic fiber and a coated rubber composition in an embodiment using (C-1) a water-dispersible (thermal dissociative blocked) isocyanate compound that is an addition product of polyisocyanate having an aromatic ring and a blocking agent having one or more active hydrogen groups.

As illustrated in FIG. 2, in the adhesive layer containing the "(C-1) water-dispersible (thermal dissociative blocked) isocyanate compound that is an addition product of polyisocyanate having an aromatic ring and a blocking agent having one or more active hydrogen groups", (C-1) a water-dispersible (thermal dissociative blocked) isocyanate compound 40 that is an addition product of polyisocyanate having an aromatic ring and a blocking agent having one or more active hydrogen groups, while diffusing into an organic fiber cord 1 (aromatic isocyanate-organic fiber diffusion effect 41), forms a polypeptide-isocyanate cross-link 22 by covalent bonds with polypeptide 12 contained in an adhesive layer inside the adhesive layer 32 of an adhesive composition 2 for organic fibers, thereby achieving that the adhesive composition 2 for organic fibers is dispersed into the gaps of the polymer chain of the organic fiber cord 1, and the adhesive layer 32 of the adhesive composition 2 for organic fibers adheres to the surface of the polymer chain of the organic fiber cord 1.

For the "(C-1) water-dispersible (thermal dissociative blocked) isocyanate compound that is an addition product of polyisocyanate having an aromatic ring and a blocking agent having one or more active hydrogen groups", the particle size is preferably 0.01 μm to 0.50 μm, as described above. The reason is as follows. When the particle size is less than 0.01 μm, the diffusion in the adhesive layer from the surface of the polymer chain of an organic fiber to the gaps of the polymer chain of the organic fiber, where aromatic π electrons are more abundantly present, becomes easier over time. As a result, the effect as an adhesion promoter decreases. Therefore, the particle size should be large enough so that the particles can remain on the surface of the organic fiber. Further, when the particle size is 0.50 μm or less, the problem that the compound precipitates in liquid to cause non-uniform diffusion in the adhesive layer is less likely to occur as the particle size decreases.

It is more preferable that the adhesive composition for organic fibers should contain "(C-2) an aqueous urethane compound having a (thermal dissociative blocked) isocyanate group" having a hydrophilic molecular chain part that is "a part that is difficult to diffuse into an organic fiber" in addition to a hydrophobic aromatic polyisocyanate part that is "a part that easily diffuse into an organic fiber" in the molecular structure.

Figure 3:
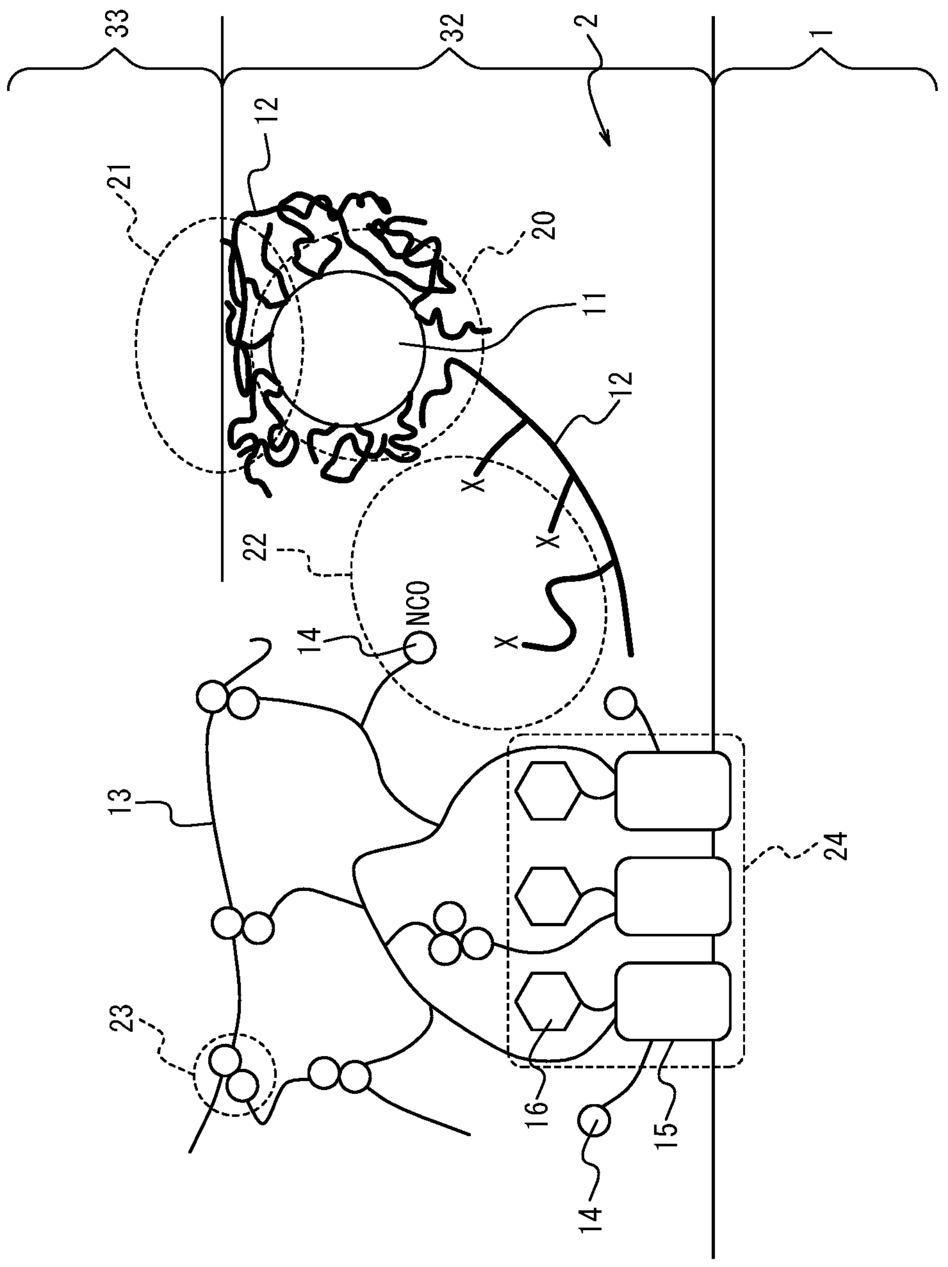
FIG. 3 schematically illustrates an example of the principle where the adhesive composition for organic fibers of the present disclosure suppresses the adhesiveness of rubber latex and improves the adhesion between an organic fiber and a coated rubber composition in an embodiment using (C-2) an aqueous urethane compound having a (thermal dissociative blocked) isocyanate group.

As illustrated in FIG. 3, a urethane resin 13 formed by an aqueous urethane compound having a (thermal dissociative blocked) isocyanate group has both a part 15 that easily interacts with the organic fiber cord 1 and a part 16 that is difficult to diffuse into the organic fiber cord 1 in an adhesive layer 32 of an adhesive composition 2 for organic fibers.

Because of the presence of the part 15 that easily interacts with the organic fiber cord 1, the adhesive layer 32 of the adhesive composition 2 for organic fibers adheres to the surface of the polymer chain of the organic fiber cord 1.

Further, because of the presence of the part 16 that is difficult to diffuse into the organic fiber cord 1, the urethane resin 13 formed by an aqueous urethane compound having a (thermal dissociative blocked) isocyanate group maintains a functional effect of promoting adhesion at the interface with the adhesive layer 32 (aqueous urethane-organic fiber interface effect 24).

As a result, the adhesive composition for organic fibers containing "(C-2) an aqueous urethane compound having a (thermal dissociative blocked) isocyanate group" provides good adhesion between an organic fiber and a coated rubber composition.

When the (C) aqueous compound having a (thermally dissociative blocked) isocyanate group is an aromatic polyisocyanate compound having an anionic or nonionic water-soluble functional group, it tends to disperse in water as compared with in the surface of the hydrophobic organic fiber cord 1. Therefore, it is more preferably (C-2) an aqueous urethane compound having a (thermal dissociative blocked) isocyanate group.

<<Regarding the Functional Effect of (b) as an Adhesion Promoter>>

As illustrated in FIG. 2, in an adhesive layer containing (C-1) a water-dispersible (thermal dissociative blocked) isocyanate compound that is an addition product of polyisocyanate having an aromatic ring and a blocking agent having one or more active hydrogen groups, an activated isocyanate group of a water-dispersible (thermal dissociative blocked) isocyanate compound 40 that is an addition product of polyisocyanate having an aromatic ring and a blocking agent having one or more active hydrogen groups from which a blocking agent has been thermally dissociated forms a polypeptide-isocyanate cross-link 22 with the molecular chain of adjacent polypeptide 12, thereby obtaining an adhesive layer containing a three-dimensional network structure.

As a result, the adhesive composition for organic fibers containing "(C-1) a water-dispersible (thermal dissociative blocked) isocyanate compound that is an addition product of polyisocyanate having an aromatic ring and a blocking agent having one or more active hydrogen groups" provides good adhesion between an organic fiber and a coated rubber composition.

Because a material in which aromatic-based powder is forcibly emulsified and dispersed is used, it is preferable to stir the dipping bath (dipping tank) 3 in FIG. 1 so that the compound will not precipitate in liquid to cause non-uniform dispersion or aggregation in the adhesive layer.

On the other hand, the adhesive composition for organic fibers of the present disclosure more preferably contains the "(C-2) aqueous urethane compound having a (thermal dissociative blocked) isocyanate group" as an adhesion promoter. Because the "(C-2) aqueous urethane compound having a (thermal dissociative blocked) isocyanate group" contains an alkylene oxide moiety or the like in the compound molecule, it can be uniformly dispersed in water by self-emulsification or the like due to swelling of water.

Because the "(C-2) aqueous urethane compound having a (thermal dissociative blocked) isocyanate group" uniformly dispersed in water contains a hydrophobic organic isocyanate moiety in the compound molecule, stable associative micelles are formed between the hydrophobic moieties of adjacent water-soluble urethanes as in the case of water-soluble urethane used in association-type thickeners, for example, thereby obtaining a three-dimensional network structure because of the hydrophobic interaction between aqueous urethanes uniformly dispersed in the liquid.

Next, the adhesive composition for organic fibers having a three-dimensional network structure by the hydrophobic bond is coated on an organic fiber cord, and then dried and subjected to heat curing. Then, as illustrated in FIG. 3, the activated isocyanate groups 14 in which the blocking agent has been thermally dissociated form activated isocyanate cross-links 23 by covalent bonds between the adjacent ones, thereby obtaining an adhesive layer containing a three-dimensional network structure of a urethane resin 13 formed by an aqueous compound having a (thermal dissociative blocked) isocyanate group. As a result, the adhesive composition for organic fibers containing the "(C-2) aqueous urethane compound having a (thermal dissociative blocked) isocyanate group" provides good adhesion between an organic fiber and a coated rubber composition.

<<Thermal Dissociative Blocking Agent and Aqueous Urethane Compound>>

The thermal dissociative blocking agent of the (C-2) aqueous compound having a (thermal dissociative blocked) isocyanate group is not particularly limited if it is a blocking agent compound that protects the isocyanate group from any chemical reaction where the blocking agent can be dissociated by heat treatment as necessary to restore the isocyanate group. Specific examples of the thermal dissociative blocking agent include the same compounds mentioned above as the blocking agent for the (C-1) water-dispersible (thermal dissociative blocked) isocyanate compound that is an addition product of polyisocyanate having an aromatic ring and a blocking agent having one or more active hydrogen groups. Preferable examples thereof include phenols such as phenol, thiophenol, chlorphenol, cresol, resorcinol, p-sec-butylphenol, p-tert-butylphenol, p-sec-amylphenol, p-octylphenol, and p-nonylphenol; secondary or tertiary alcohols such as isopropyl alcohol and tert-butyl alcohol; aromatic secondary amines such as diphenylamine and xylidine; phthalic acid imides; lactams such as δ-valerolactam; caprolactams such as ε-caprolactam; malonic acid dialkyl esters such as diethyl malonate and dimethyl malonate, active methylene compounds such as acetylacetone and acetoacetic acid alkyl ester; oximes such as acetone oxime, methyl ethyl ketoxime, and cyclohexanone oxime; and basic nitrogen compounds and acid sodium sulfites such as 3-hydroxypyridine, 1,2-pyrazole, 3,5-dimethylpyrazole, 1,2,4-triazole, diisopropylamine, and N,N'-diphenylformamidine.

The blocking agent is preferably phenol, ε-caprolactam and ketoxime, which facilitates stable heat curing of the adhesive composition by thermal dissociation by heating.

The "aqueous" of the "aqueous urethane compound" indicates that it is water-soluble or water-dispersible. The "water-soluble" does not necessarily mean completely water-soluble, but also means that it is partially water-soluble, and it also means that phase separation will not occur in the aqueous solution of the adhesive composition for organic fibers.

The "urethane compound" of the "aqueous urethane compound" is a compound having a covalent bond formed between nitrogen of an amine and carbon of a carbonyl group, and it refers to a compound represented by the following general formula (2),

[Chem. 1]

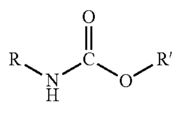

(2)

where R and R' represent a hydrocarbon group.

The molecular weight of the "(C-2) aqueous urethane compound having a (thermal dissociative blocked) isocyanate group" is not particularly limited if the compound is water-based. However, the number average molecular weight is preferably 1,500 to 100,000. The number average molecular weight is particularly preferably 9,000 or less.

As described above, a method of synthesizing the "(C-2) aqueous urethane compound having a (thermal dissociative blocked) isocyanate group" is not particularly limited, and a known method such as the method described in JP S63-51474 A may be used.

<<Preferred Embodiment of "(C-2) Aqueous Urethane Compound Having a (Thermal Dissociative Blocked) Isocyanate Group">>

A preferred embodiment of the "(C-2) aqueous urethane compound having a (thermal dissociative blocked) isocyanate group" is a reaction product obtained by mixing (α), (β), (γ) and (δ) and reacting them, where (α) is an organic polyisocyanate compound having 3 or more and 5 or less functional groups and having a number average molecular weight of 2,000 or less, (β) is a compound having 2 or more and 4 or less active hydrogen groups and a number average molecular weight of 5,000 or less, (γ) is a thermal dissociative blocking agent, and (δ) is a compound having at least one active hydrogen group and at least one anionic, cationic, or nonionic hydrophilic group, and (α), (β), (γ) and (δ) are mixed so that the mixing ratio of (α) is 40% by mass or more and 85% by mass or less, the mixing ratio of (β) is 5% by mass or more and 35% by mass or less, the mixing ratio of (γ) is 5% by mass or more and 35% by mass or less, and the mixing ratio of (δ) is 5% by mass or more and 35% by mass or less with respect to the total amount of (α), (β), (γ) and (δ), and when the molecular weight of the isocyanate group (—NCO) is 42, the composition ratio of the (thermal dissociative blocked) isocyanate group in the reaction product is 0.5% by mass or more and 11% by mass or less. This improves the adhesion between an organic fiber and a coated rubber composition.

In this case, the "(C-2) aqueous urethane compound having a (thermal dissociative blocked) isocyanate group" has both a (thermal dissociative blocked) isocyanate group moiety and a hydrophilic moiety having a hydrophilic group, so that the self-water solubility of the urethane compound is increased.

The (α) organic polyisocyanate compound having 3 or more and 5 or less functional groups and having a number average molecular weight of 2,000 or less is not particularly limited. However, it is preferably an aromatic polyisocyanate compound and an oligomer thereof, and it may be other aliphatic, alicyclic, or heterocyclic polyisocyanate compound and an oligomer thereof. This is because the "(C-2) aqueous urethane compound having a (thermal dissociative blocked) isocyanate group" obtained as a reaction product after reacting the (α) organic polyisocyanate compound having 3 or more and 5 or less functional groups and having a number average molecular weight of 2,000 or less as described above is easier to disperse into the gaps of the polymer chain of an organic fiber.

Specific examples thereof include, as an aliphatic polyisocyanate compound, ethylene diisocyanate, 1,4-tetramethylene diisocyanate, 1,6-hexamethylene diisocyanate, 1,12-dodecane diisocyanate, 2,2,4-trimethylhexamethylene diisocyanate, 2,4,4-trimethylhexamethylene diisocyanate, dimer acid diisocyanate, and lysine diisocyanate, as an alicyclic polyisocyanate compound, cyclobutane-1,3-diisocyanate, cyclohexane-1,3-diisocyanate, cyclohexane-1,4-diisocyanate, isophorone diisocyanate, 4,4'-methylenebis (cyclohexylisocyanate), methylcyclohexane-2,4-diisocyanate, methylcyclohexane-2,6-diisocyanate, and 1,3-(isocyanatomethyl) cyclohexane, as a heterocyclic polyisocyanate compound, tolylene diisocyanate adduct of 1,3,5-tris (2'-hydroxyethyl) isocyanuric acid, as an aromatic polyisocyanate compound, m-phenylene diisocyanate, p-phenylene diisocyanate, 2,4-tolylene diisocyanate, 2,6-tolylene diisocyanate, m-xylylene diisocyanate, p-xylylene diisocyanate, 2,4'-diphenylmethane diisocyanate, 4,4'-diphenylmethane diisocyanate, m-tetramethylxylylene diisocyanate, p-tetramethylxylylene diisocyanate, methinetris (4-phenylisocyanate), tris (4-isocyanatophenyl) methane, tris thiophosphate (4-isocyanatophenyl ester), 3-isopropenyl-α',α'-dimethylbenzyl isocyanate and oligomer mixtures thereof, and modified products such as carbodiimides, polyols and allophanates of these polyisocyanate compounds.

Among the above, an aromatic polyisocyanate compound is preferable, and methylenediphenyl polyisocyanate, polyphenylene polymethylene polyisocyanate and the like are particularly preferable. Polyphenylene polymethylene polyisocyanate having a number average molecular weight of 2,000 or less is preferable, and polyphenylene polymethylene polyisocyanate having a number average molecular weight of 1,000 or less is particularly preferable. This is because the "(C-2) aqueous urethane compound having a (thermal dissociative blocked) isocyanate group" obtained as a reaction product after reacting the (α) organic polyisocyanate compound having 3 or more and 5 or less functional groups and having a number average molecular weight of 2,000 or less as described above is easier to disperse into the gaps of the polymer chain of an organic fiber.

The (β) compound having 2 or more and 4 or less active hydrogen groups and a number average molecular weight of 5,000 or less is not particularly limited. Specific examples thereof include compounds selected from the group consisting of the following (i) to (vii), (i) polyhydric alcohols having 2 or more and 4 or less hydroxyl groups and having a number average molecular weight of 5,000 or less, (ii) multivalent amines having 2 or more and 4 or less primary and/or secondary amino groups and having a number average molecular weight of 5,000 or less, (iii) amino alcohols having 2 or more and 4 or less primary and/or secondary amino groups and hydroxyl groups and having a number average molecular weight of 5,000 or less, (iv) polyester polyols having 2 or more and 4 or less hydroxyl groups and having a number average molecular weight of 5,000 or less, (v) polybutadiene polyols having 2 or more and 4 or less hydroxyl groups and having a number average molecular weight of 5,000 or less, and copolymers thereof with other vinyl monomers, (vi) polychloroprene polyols having 2 or more and 4 or less hydroxyl groups and having a number average molecular weight of 5,000 or less, and copolymers thereof with other vinyl monomers, and (vii) polyether polyols having 2 or more and 4 or less hydroxyl groups and having a number average molecular weight of 5,000 or less, which is multivalent amine, C2-C4 alkylene oxide heavy adduct of polyhydric phenol and amino alcohols, C2-C4 alkylene oxide heavy adduct of C3 or higher polyhydric alcohols, C2-C4 alkylene oxide copolymer, or C3-C4 alkylene oxide polymer.

For the "(C-2) aqueous urethane compound having a (thermal dissociative blocked) isocyanate group", the "active hydrogen group" refers to a group containing hydrogen that becomes active hydrogen (atomic hydrogen (hydrogen radical) and hydride ion (hydride)) when placed under suitable conditions. Examples of the active hydrogen group include an amino group and a hydroxyl group.

The compound having at least one active hydrogen group and at least one anionic hydrophilic group of the "(δ) compound having at least one active hydrogen group and at least one anionic, cationic, or nonionic hydrophilic group" is not particularly limited. Examples thereof include aminosulfonic acids such as taurine, N-methyltaurine, N-butyltaurine and sulfanilic acid, and aminocarboxylic acids such as glycine and alanine.

A method of synthesizing the "(C-2) aqueous urethane compound having a (thermal dissociative blocked) isocyanate group" by mixing and reacting the above-described (α), (β), (γ) and (δ) is not particularly limited, and a known method such as the method described in JP S63-51474 A may be used.

<<Another Preferred Embodiment of "(C-2) Aqueous Urethane Compound Having a (Thermal Dissociative Blocked) Isocyanate Group">>

Another preferred embodiment of the "(C-2) aqueous urethane compound having a (thermal dissociative blocked) isocyanate group" is a reaction product obtained by mixing (α), (β), (γ), (δ) and (ε) and reacting them, where (α) is an organic polyisocyanate compound having 3 or more and 5 or less functional groups and having a number average molecular weight of 2,000 or less, (β) is a compound having 2 or more and 4 or less active hydrogen groups and a number average molecular weight of 5,000 or less, (γ) is a thermal dissociative blocking agent, (δ) is a compound having at least one active hydrogen group and at least one anionic, cationic, or nonionic hydrophilic group, and (ε) is a compound containing an active hydrogen group other than (α), (β), (γ) and (δ), and (α), (β), (γ), (δ) and (ε) are mixed so that the mixing ratio of (α) is 40% by mass or more and less than 85% by mass, the mixing ratio of (β) is 5% by mass or more and 35% by mass or less, the mixing ratio of (γ) is 5% by mass or more and 35% by mass or less, the mixing ratio of (δ) is 5% by mass or more and 35% by mass or less, and the mixing ratio of (ε) is more than 0% by mass and 45% by mass or less with respect to the total amount of (α), (β), (γ), (δ) and (ε), and when the molecular weight of the isocyanate group (—NCO) is 42, the composition ratio of the (thermal dissociative blocked) isocyanate group in the reaction product is 0.5% by mass or more and 11% by mass or less.

In this case, the (C-2) aqueous urethane compound having a (thermal dissociative blocked) isocyanate group has both a (thermal dissociative blocked) isocyanate group moiety and a hydrophilic moiety having a hydrophilic group, so that the self-water solubility of the urethane compound is increased.

Here, the (α) organic polyisocyanate compound having 3 or more and 5 or less functional groups and having a number average molecular weight of 2,000 or less, the (β) compound having 2 or more and 4 or less active hydrogen groups and a number average molecular weight of 5,000 or less, the (γ) thermal dissociative blocking agent, and the (δ) compound having at least one active hydrogen group and at least one anionic, cationic, or nonionic hydrophilic group are as described in the <<preferred embodiment of "(C-2) aqueous urethane compound having a (thermal dissociative blocked) isocyanate group">> except for the mixing ratio.

A method of synthesizing the "(C-2) aqueous urethane compound having a (thermal dissociative blocked) isocyanate group" by mixing and reacting the above-described (α), (β), (γ), (δ) and (ε) is not particularly limited, and a known method such as the method described in JP S63-51474 A may be used.

<<Yet Another Preferred Embodiment of "(C-2) Aqueous Urethane Compound Having a (Thermal Dissociative Blocked) Isocyanate Group">>

Yet another preferred embodiment of the "(C-2) aqueous urethane compound having a (thermal dissociative blocked) isocyanate group" is represented by the following general formula (1),

[Chem. 2]

(1)

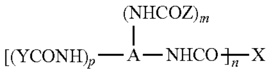

[where

A is a residue of an organic polyisocyanate compound from which an active hydrogen group has been eliminated, X is a residue of a polyol compound having 2 or more and 4 or less hydroxyl groups and having a number average molecular weight of 5,000 or less from which an active hydrogen group has been eliminated, Y is a residue of a thermal dissociative blocking agent from which an active hydrogen group has been eliminated, Z is a residue of a compound having at least one active hydrogen group and a group that produces at least one salt or a hydrophilic polyether chain, from which an active hydrogen group has been eliminated, n is an integer of 2 or more and 4 or less, and p+m is an integer of 2 or more and 4 or less (m≥0.25)]. This improves the adhesion between an organic fiber and a coated rubber composition.

In this case, the "(C-2) aqueous urethane compound having a (thermal dissociative blocked) isocyanate group" has both a (thermal dissociative blocked) isocyanate group moiety and a hydrophilic moiety having a hydrophilic group, so that the self-water solubility of the urethane compound is increased.

In the formula (1), the "organic polyisocyanate compound" of the A "residue of an organic polyisocyanate compound from which an active hydrogen group has been eliminated" preferably contains an aromatic ring. In this case, the "(C-2) aqueous urethane compound having a (thermal dissociative blocked) isocyanate group" is easier to disperse into the gaps of the polymer chain of an organic fiber.

Examples thereof include, but are not limited to, methylenediphenyl polyisocyanate and polyphenylene polymethylene polyisocyanate. Polyphenylene polymethylene polyisocyanate having a number average molecular weight of 6,000 or less is preferable, and polyphenylene polymethylene polyisocyanate having a number average molecular weight of 4,000 or less is particularly preferable.

In the formula (1), the "polyol compound having 2 or more and 4 or less hydroxyl groups and having a number average molecular weight of 5,000 or less" of the X "residue of a polyol compound having 2 or more and 4 or less hydroxyl groups and having a number average molecular weight of 5,000 or less from which an active hydrogen group has been eliminated" is not particularly limited. Specific examples thereof include compounds selected from the group consisting of the following (i) to (vi), (i) polyhydric alcohols having 2 or more and 4 or less hydroxyl groups and having a number average molecular weight of 5,000 or less, (ii) amino alcohols having 2 or more and 4 or less primary and/or secondary amino groups and hydroxyl groups and having a number average molecular weight of 5,000 or less, (iii) polyester polyols having 2 or more and 4 or less hydroxyl groups and having a number average molecular weight of 5,000 or less, (iv) polybutadiene polyols having 2 or more and 4 or less hydroxyl groups and having a number average molecular weight of 5,000 or less, and copolymers thereof with other vinyl monomers, (v) polychloroprene polyols having 2 or more and 4 or less hydroxyl groups and having a number average molecular weight of 5,000 or less, and copolymers thereof with other vinyl monomers, and (vi) polyether polyols having 2 or more and 4 or less hydroxyl groups and having a number average molecular weight of 5,000 or less, which is multivalent amine, C2-C4 alkylene oxide heavy adduct of polyhydric phenol and amino alcohols, C2-C4 alkylene oxide heavy adduct of C3 or higher polyhydric alcohols, C2-C4 alkylene oxide copolymer, or C3-C4 alkylene oxide polymer.

The "(C-2) aqueous urethane compound having a (thermal dissociative blocked) isocyanate group" is not particularly limited, and commercially available products such as ELASTRON BN27, BN77, and BN11 manufactured by DKS Co. Ltd. can be used. The BN77 was suitably used in the EXAMPLES section of the present disclosure.

<(D) Epoxide Compound>

An embodiment of the adhesive composition for organic fibers of the present disclosure contains (A) rubber latex having unsaturated diene, (B) polypeptide, and (D) an epoxide compound.

The adhesive composition contains no resorcin.

The "(D) epoxide compound" refers to a compound having oxacyclopropane (oxirane) (epoxy group), which is a three-membered ring ether, in its structural formula.

The "(D) epoxide compound" functions as a cross-linking agent component in the adhesive composition for organic fibers. That is, when the adhesive composition contains the "(D) epoxide compound", cross-linking is introduced among a hydroxyl group, an amine group, and a thiol group contained in an amino acid unit of the (B) polypeptide, the fracture resistance of the adhesive layer is improved, and the adhesiveness at high temperatures is significantly improved.

Further, it is preferable that the "(D) epoxide compound" should be mixed with the "(C) aqueous compound having a (thermal dissociative blocked) isocyanate group" and heated. The reason is as follows. When the "(D) epoxide compound" is mixed with the "(C) aqueous compound having a (thermal dissociative blocked) isocyanate group" and heated, cross-linking caused by a nucleophilic reaction between the epoxy group of the "(D) epoxide compound" and the amine, alcohol, thiol, phenol, carboxylic acid, or isocyanate (with thermal dissociative block dissociated) and the like of the (C) aqueous compound having a (thermal dissociative blocked) isocyanate group is added to the adhesive composition for organic fibers mainly composed of urethane bonds, thereby suppressing creep and flow due to stress in a high temperature region.

The epoxy group of the "(D) epoxide compound" is preferably polyfunctional. This is because in this case, the suppressing effect is improved, the fracture resistance of the adhesive layer of the adhesive composition for organic fibers is further improved, and the adhesiveness at high temperatures is also improved.

The "(D) epoxide compound" is preferably a compound containing two or more epoxy groups in one molecule. It is particularly preferably a compound containing four or more epoxy groups in one molecule. The reason is as follows. The epoxy group is a polyfunctional group, so that the fracture resistance of the adhesive layer of the adhesive composition for organic fibers is further increased, and the adhesiveness at high temperatures is also increased, as described above.

Further, when the (D) epoxide compound has two or more epoxy groups in one molecule, creep or flow due to stress at high temperatures is further suppressed in the adhesive composition for organic fibers containing the (D) epoxide compound, and the adhesiveness at high temperatures is further increased.

Specific examples of the "(D) epoxide compound" include reaction products of epichlorohydrin and polyhydric alcohols such as diethylene glycol/diglycidyl ether, polyethylene/diglycidyl ether, polypropylene glycol/diglycidyl ether, neopentyl glycol/diglycidyl ether, 1,6-hexanediol/diglycidyl ether, glycerol/polyglycidyl ether, trimethylolpropane/polyglycidyl ether, polyglycerol/polyglycidyl ether, pentaerythiol/polyglycidyl ether, diglycerol/polyglycidyl ether, and sorbitol/polyglycidyl ether; novolak-type epoxy resin such as phenol novolak-type epoxy resin and cresol novolak-type epoxy resin; and bisphenol A-type epoxy resin. It is preferably a reaction product of polyhydric alcohols and epichlorohydrin, or a novolak-type epoxy resin. It is more preferably a reaction product of polyhydric alcohols and epichlorohydrin. Because (D) an epoxide compound that is a reaction product of polyhydric alcohols and epichlorohydrin can be dissolved in water or be dispersed in water by emulsification, it is easier to produce an adhesive composition for organic fibers containing such a (D) epoxide compound.

Commercially-available chemicals may be used as the sorbitol/polyglycidyl ether, polyglycerol/polyglycidyl ether, and novolak-type epoxy resin.

The "(D) epoxide compound" can be used by being dissolved in water or dispersed in water by emulsification. For example, the "(D) epoxide compound" can be dissolved in water as it is. Alternatively, the "(D) epoxide compound" can be dissolved in a small amount of solvent as needed, and the solution can be emulsified into water using a known emulsifier (such as alkylbenzene sulfonic acid soda, dioctylsulfosuccinate sodium salt, and nonylphenol ethylene oxide adduct) to obtain an emulsified solution.

The content (solid content) of the "(D) epoxide compound" is not particularly limited, but it is preferably 1% by mass or more and more preferably 5% by mass or more. Further, it is preferably 45% by mass or less and more preferably 40% by mass or less. The reason is as follows. When the content is 1% by mass or more, the adhesion between resin and a coated rubber composition is improved. Further, when the content is 40% by mass or less, it is possible to relatively secure a certain amount or more of other components such as rubber latex blended in the adhesive composition, which improves the adhesiveness to rubber as an adherend.

<(E) Polyphenol>

An embodiment of the adhesive composition for organic fibers of the present disclosure contains (A) rubber latex having unsaturated diene, (B) polypeptide, and (E) polyphenol.

The adhesive composition contains no resorcin. Further, the adhesive composition preferably contains no formaldehyde.

The "(E) polyphenol" is preferably a plant-derived compound having a plurality of phenolic hydroxy groups in the molecule. This improves the adhesion between an organic fiber and a coated rubber composition.

Although studies have been conducted for a long time to separate polyphenols such as lignin and tannin, which are components in wood and bark, and react them with formaldehyde to produce adhesives (for example, JP H07-53858 A), there is little knowledge of producing aqueous adhesive compositions containing no resorcin.

Further, the (E) polyphenol is preferably lignin or a derivative thereof. This case provides better adhesion between an organic fiber and a coated rubber composition. Particularly preferred examples of the lignin or a derivative thereof include calcium lignin sulfonate, sodium lignin sulfonate, potassium lignin sulfonate, and magnesium lignin sulfonate obtained from eluate of sulfite pulp or the like, among which sodium lignin sulfonate and the like are preferable.

The content (solid content) of the "(E) polyphenol" is not particularly limited, but it is preferably 5% by mass or more, more preferably 10% by mass or more, and still more preferably 20% by mass or more. Further, it is preferably 75% by mass or less, more preferably 60% by mass or less, and still more preferably 50% by mass or less. The reason is as follows. When the content is 5% by mass or more, the adhesion between an organic fiber and a coated rubber composition is improved. Further, when the content is 75% by mass or less, it is possible to relatively secure a certain amount or more of other components such as rubber latex blended in the adhesive composition for organic fibers, which improves the adhesiveness to rubber as an adherend.

<Method of Producing Adhesive Composition for Organic Fibers>

The adhesive composition for organic fibers of the present disclosure contains (A) rubber latex having unsaturated diene, (B) polypeptide, and at least one compound selected from the group consisting of the following (C) to (E), (C) an aqueous compound having a (thermal dissociative blocked) isocyanate group, (D) an epoxide compound, and (E) polyphenol.

In producing the adhesive composition for organic fibers, the (A) rubber latex having unsaturated diene, the (B) polypeptide, the (C) aqueous compound having a (thermal dissociative blocked) isocyanate group, the (D) epoxide compound, and the (E) polyphenol can be mixed in any order.

However, when the "(D) epoxide compound" is mixed with water, the epoxy group reacts with water, and the function as a cross-linking agent tends to be gradually deactivated. Therefore, after mixing the "(D) epoxide compound" with water, it is preferable to subject the adhesive composition for organic fibers to coating treatment of an organic fiber as soon as possible. Specifically, it is preferable to subject the adhesive composition for organic fibers to coating treatment of an organic fiber within two days after mixing the "(D) epoxide compound" with water, and it is more preferable within one day.

In the adhesive composition for organic fibers of the present disclosure, the mixed mass ratio of the "(A) rubber latex having unsaturated diene" and the "(B) polypeptide" [(A):(B)] (in terms of solid content) is not particularly limited. However, it is preferably in a range of 100:0.1 to 100:25 and more preferably in a range of 100:0.2 to 100:5 (including the value at both ends). The reason is as follows.

When the mixed mass ratio is 100:0.1 or more (when the ratio value is 1000 or less), the "(A) rubber latex having unsaturated diene" serves as a core, a film of microcapsule of the "(B) polypeptide" can be formed around the core, and an adhesive layer with sufficient strength can be obtained.

When the mixed mass ratio is 100:25 or less (when the ratio value is 4 or more), the "(A) rubber latex having unsaturated diene" serves as a core, and a film of microcapsule of the "(B) polypeptide" formed around the core is not too thick. When a coated rubber composition, which is an adherend of an organic fiber, and the adhesive composition for organic fibers are co-vulcanized and adhered, the coated rubber composition as the adherend and the "(A) rubber latex having unsaturated diene" are well compatible with each other. As a result, an initial process of the adhesion between the coated rubber composition as the adherend and the adhesive composition for organic fibers proceeds favorably.

During the mixing of the "(A) rubber latex having unsaturated diene" and the "(B) polypeptide", a known water-soluble material capable of strengthening the film of the "(B) polypeptide" can be used as well as a conventional coacervate. For example, electrolyte materials containing gum arabic, carrageenan, CMCs and organic or inorganic salts, such as salts with cations like sodium chloride, potassium chloride, magnesium chloride and ammonium chloride, and salts with anions like sulfates, phosphates, carbonates and acetates may be used.

Further, liquid substances that are water-soluble liquid and in which the film-forming material dissolves less than water, such as alcohols like ethanol and propanol, or water-soluble polymers such as isobutylene-maleic anhydride ring-opening copolymer salts may be used.

In the adhesive composition for organic fibers of the present disclosure, the mixed mass ratio of the "(A) rubber latex having unsaturated diene" and the "compound selected from the group consisting of the (C) aqueous compound having a (thermal dissociative blocked) isocyanate group, the (D) epoxide compound, and the (E) polyphenol" [(A):((C)+(D)+(E))](in terms of solid content) is not particularly limited. However, it is preferably in a range of 100:5 to 100:300, more preferably in a range of 100:15 to 100:150, and still more preferably in a range of 100:20 to 100:70 (including the value at both ends). The reason is as follows.

When the mixed mass ratio is 100:5 or more (when the ratio value is 20 or less), the ratio of the "(A) rubber latex having unsaturated diene" in the adhesive composition for organic fibers is not too large, the fracture resistance of an adhesive layer of the adhesive composition for organic fibers can be sufficiently maintained, and deterioration of the adhesiveness under strain can be prevented.

Further, when the mixed mass ratio is 100:300 or less (when the ratio value is ⅓ or more), the ratio of the "(A) rubber latex having unsaturated diene" in the adhesive composition for organic fibers is not too low, and the compatibility between a coated rubber composition, which is an adherend of an organic fiber, and the "(A) rubber latex having unsaturated diene" is improved when the coated rubber composition as the adherend and the adhesive composition for organic fibers are co-vulcanized and adhered. As a result, the adhesiveness between the coated rubber composition as the adherend and the adhesive composition for organic fibers is sufficiently high.

The (A) rubber latex having unsaturated diene, the (B) polypeptide, the (C) aqueous compound having a (thermal dissociative blocked) isocyanate group, the (D) epoxide compound, and the (E) polyphenol are preferably water-based. This is because water, which causes little damage to the environment, can be used as a solvent in this case.

[Organic Fiber-Rubber Composite]

An organic fiber-rubber composite of the present disclosure uses an organic fiber coated with the adhesive composition for organic fibers of the present disclosure. The organic fiber-rubber composite of the present disclosure has the effects of (1), (2) and (3).

Further, an organic fiber cord-rubber composite of the present disclosure uses an organic fiber cord coated with the adhesive composition for organic fibers of the present disclosure. The organic fiber cord-rubber composite of the present disclosure has the effects of (1), (2) and (3).

The organic fiber-rubber composite of the present disclosure will be described in detail with reference to FIG. 4.

Figure 4:
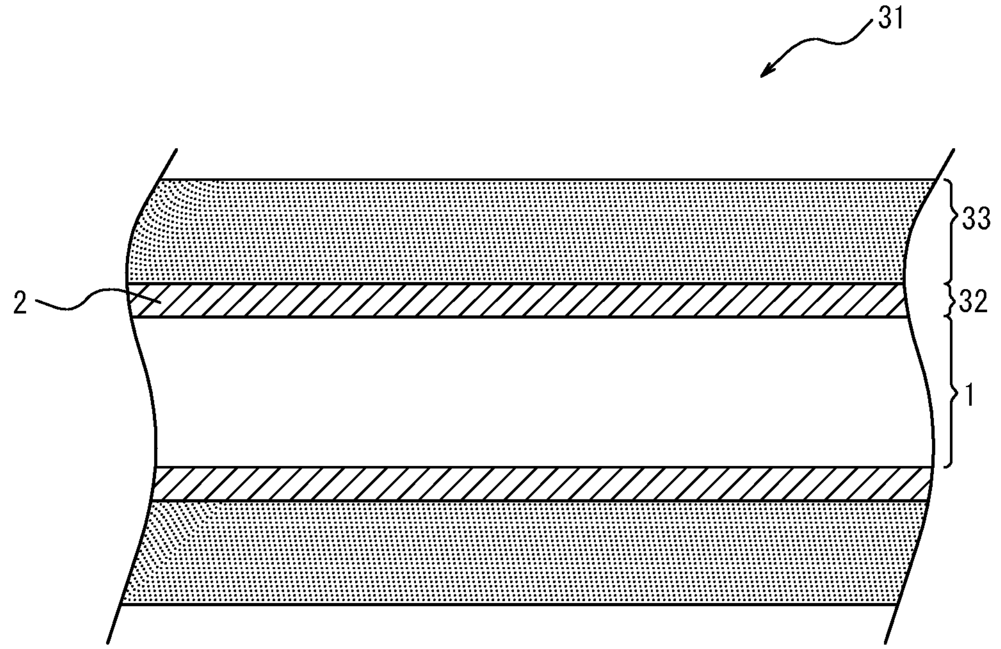
FIG. 4 schematically illustrates a cross section of an example of the organic fiber-rubber composite of the present disclosure.

FIG. 4 schematically illustrates a cross section of an example of the organic fiber-rubber composite of the present disclosure. In an organic fiber-rubber composite 31 illustrated in FIG. 4, the outer surface in the outer diameter direction of an organic fiber cord 1 is coated with an adhesive layer 32 formed by an adhesive composition 2 for organic fibers of the present disclosure. The organic fiber cord 1 is further adhered to a coated rubber composition 33 located on the outer side in the outer diameter direction via the adhesive 32 of the adhesive composition 2 for organic fibers to form an organic fiber-rubber composite 31 of the present disclosure.

In addition to the organic fiber-rubber composite (organic fiber cord-rubber composite), a rubber reinforcing material using the adhesive composition for organic fibers of the present disclosure may be a film, a short fiber, a non-woven fabric, or the like.

<<Organic Fiber (Especially Organic Fiber Cord) of the Organic Fiber-Rubber Composite>>

The organic fiber (especially organic fiber cord) of the organic fiber-rubber composite of the present disclosure is as described in the <Organic fiber (especially organic fiber cord)> section.

<<Coated Rubber Composition of the Organic Fiber-Rubber Composite>>

On the other hand, the coated rubber composition of the organic fiber-rubber composite of the present disclosure preferably contains a rubber component blended with a compounding agent usually used in the rubber industry. The rubber component is not particularly limited, and examples thereof include natural rubber, conjugated diene-based synthetic rubber such as polyisoprene rubber (IR), polybutadiene rubber (BR), styrene-butadiene copolymer rubber (SBR), acrylonitrile-butadiene rubber (NBR), chloroprene rubber (CR) and butyl rubber (IIR), and ethylene-propylene copolymer rubber (EPM), ethylene-propylene-diene copolymer rubber (EPDM), and polysiloxane rubber. Among the above, natural rubber and conjugated diene-based synthetic rubber are preferable. These rubber components may be used alone or in combination of two or more.

<<Method of Producing Organic Fiber-Rubber Composite>>

The organic fiber-rubber composite of the present disclosure can be produced by coating an organic fiber (especially an organic fiber cord) with the adhesive composition for organic fibers of the present disclosure to form an adhesive layer, and co-vulcanizing and adhering the "(A) rubber latex having unsaturated diene" in the adhesive composition for organic fibers and a rubber component in a coated rubber composition which is an adherend of the organic fiber.

A method of coating the organic fiber cord with the adhesive composition for organic fibers of the present disclosure is not particularly limited. It may be a method of immersing the organic fiber cord in the adhesive composition for organic fibers, a method of applying the adhesive composition for organic fibers to the organic fiber cord with a brush, a method of spraying the adhesive composition for organic fibers onto the organic fiber cord, or the like, and an appropriate method may be used as needed.

When the organic fiber cord is coated with the adhesive composition for organic fibers, the adhesive composition for organic fibers is preferably dissolved in various solvents to reduce the viscosity, because the coating is facilitated in this case. It is environmentally preferable that the solvent for reducing the viscosity of the adhesive composition for organic fibers should be mainly composed of water.

The thickness of an adhesive layer of the adhesive composition for organic fibers is not particularly limited, but it is preferably 50 μm or less, and it is more preferably 0.5 μm or more and 30 μm or less.

When the amount of the adhesive composition adhered by adhesive treatment is increased, the adhesive durability under tire rolling tends to decrease. The reason is as follows. Due to the high rigidity of a fiber material, the adhesive composition at the interface of an adhered fiber material has relatively small deformation because the fiber material bears the stress due to strain. However, the deformation due to strain increases as the distance from the interface increases. Because the adhesive composition contains a large amount of thermosetting condensate as compared with the adhered rubber material, it is hard and brittle. As a result, the adhesive fatigue under repeated strain tends to increase. Therefore, the average thickness of the adhesive composition layer is preferably 50 μm or less. It is more preferably 0.5 μm or more and 30 μm or less.

The concentration of the adhesive composition for organic fibers impregnated in the organic fiber cord is not particularly limited. However, it is preferably 5.0% by mass or more and 25.0% by mass or less, and more preferably 7.5% by mass or more and 20.0% by mass or less with respect to the mass of the organic fiber cord (both are values in terms of solid content).

The organic fiber coated with the adhesive composition for organic fibers is preferably, for example, dried at a temperature of 100° C. or higher and 210° C. or lower, and then subjected to heat treatment at a temperature equal to or higher than the glass transition temperature of the polymer chain of the organic fiber (typically a temperature of the polymer chain [melting temperature: −70° C.] or higher and the [melting temperature: −10° C.] or lower).

The reason this case is preferable is as follows. When the temperature is equal to or higher than the glass transition temperature of the polymer chain of the organic fiber, the molecular mobility of the polymer chain of the organic fiber is good, and the adhesion promoter (such as the (C) aqueous compound having a (thermal dissociative blocked) isocyanate group) in the adhesive composition for organic fibers and the polymer chain of the organic fiber can sufficiently interact with each other. As a result, it is possible to obtain sufficient adhesiveness between the adhesive composition for organic fibers and the organic fiber.

The organic fiber may be pretreated by electron beam, microwave, corona discharge, plasma treatment, or the like.

In the organic fiber-rubber composite of the present disclosure, the resin material may be in any form such as a film, a cord, a cable, a filament, a filament tip, a cord fabric, and a canvas, when the organic fiber is an organic fiber. Especially when the organic fiber cord-rubber composite is used for reinforcing a rubber article such as a tire article or a conveyor belt, a cord obtained by twisting a plurality of filaments is preferably used as the resin. In such a cord, it is preferable that the synthetic fiber be obtained by second twisting and first twisting, where the twist constant of the first twist is preferably 1,300 to 2,500, and the twist constant of the second twist is preferably 900 to 1,800. In the present disclosure, it is preferably an organic fiber cord-rubber composite where the organic fiber cord is a 66-nylon tire cord having a twist structure of 1400 dtex/2, a second twist number of 39 times/10 cm, and a first twist number of 39 times/10 cm, and the adhesive composition for organic fibers is adhered to the tire cord.

Finally, for the organic fiber cord coated with the adhesive composition for organic fibers, the (A) rubber latex having unsaturated diene in the adhesive composition for organic fibers and a rubber component in a coated rubber composition, which is an adherend of the organic fiber, are co-vulcanized and adhered.

In the co-vulcanization of the rubber component in the coated rubber composition, for example, sulfur, tylalium polysulfide compounds such as tetramethyltylalium disulfide and dipentamethylenetylalium tetrasulfide, organic vulcanizing agents such as 4,4-dithiomorpholin, p-quinone dioxime, p,p'-dibenzoquinone dioxime, cyclic sulfur imide, and the like may be used. Among the above, it is preferable to use sulfur. Further, various compounding agents such as a filler like carbon black, silica and aluminum hydroxide commonly used in the rubber industry, a vulcanization accelerator, an age resistor, and a softener may be appropriately added to the rubber component in the coated rubber composition.

Needless to say, the adhesive composition for organic fibers of the present disclosure can obtain an adhesive effect even in an adhesive method where a vulcanizing agent contained in an adherend of a synthetic resin material such as an organic fiber cord and/or an adherend of a coated rubber composition is transferred to the adhesive composition for organic fibers, and the adhesive composition for organic fibers is cross-linked by the transferred vulcanizing agent.

<Tire>

The tire of the present disclosure uses the organic fiber-rubber composite (or organic fiber cord-rubber composite) of the present disclosure. The tire of the present disclosure has the effects (1), (2) and (3).

In the tire of the present disclosure, the organic fiber-rubber composite (especially organic fiber cord-rubber composite) can be used, for example, as a carcass, a belt, a belt reinforcing layer, and a reinforcing layer around a belt such as a flipper.

In accordance with the type of tire, the tire of the present disclosure may be obtained by first shaping a tire using an unvulcanized rubber composition and then vulcanizing the tire, or by first shaping a tire using semi-vulcanized rubber yielded by a preliminary vulcanization process and then fully vulcanizing the tire. For the tire of the present disclosure, an organic fiber that has been treated with the above-described adhesive composition can be used in any part of the tire, and other members are not particularly limited and may be known members. The tire of the present disclosure is preferably a pneumatic tire. The pneumatic tire may be filled with ordinary air or air with an adjusted partial pressure of oxygen, or may also be filled with an inert gas such as nitrogen, argon, or helium.

The adhesive composition for organic fibers of the present disclosure and the organic fiber-rubber composite of the present disclosure described above can be applied to, in addition to the tire, all rubber articles such as a conveyor belt, a belt, a hose, and an air spring.

EXAMPLES

The following describes the present disclosure in more detail with reference to examples, but the present disclosure is not limited to the following examples.

<(A) Rubber Latex Having Unsaturated Diene>

In the following comparative examples and examples, vinylpyridine-styrene-butadiene copolymer latex (synthetic rubber latex having unsaturated diene) was prepared in accordance with Comparative Example 1 described in JP H09-78045 A and used as the (A) rubber latex having unsaturated diene as follows.

In a nitrogen-substituted autoclave having a capacity of 5 liters, 130 parts by mass of deionized water and 4.0 parts by mass of potassium rosinate were charged and dissolved. A monomer mixture having a composition of 15 parts by mass of vinylpyridine monomer, 15 parts by mass of styrene and 70 parts by mass of butadiene, and 0.60 parts by mass of t-dodecyl mercaptan were added to this and emulsified. Next, the temperature was raised to 50° C., 0.5 parts by mass of potassium persulfate was added, and polymerization was started. After the reaction rate of the monomer mixture reached 90%, 0.1 parts by mass of hydroquinone was added to terminate the polymerization. Next, unreacted monomers were removed under reduced pressure to obtain vinylpyridine-styrene-butadiene copolymer latex having a solid content concentration of 41% by mass.

<(B) Polypeptide>

In the following examples,

- product name "Promis HYDOROMILK" (solid content concentration=30% by mass) manufactured by SEIWA KASEI CO., LTD., which is milk-derived polypeptide, product name "Promis WS-HF" (solid content concentration=25% by mass) manufactured by SEIWA KASEI CO., LTD., which is soybean-derived polypeptide, product name "Promis Silk-1000F" (solid content concentration=6.5% by mass) manufactured by SEIWA KASEI CO., LTD., which is fibroin-derived polypeptide, product name "Promis W32-U" (solid content concentration=20% by mass) manufactured by SEIWA KASEI CO., LTD., which is fish scale-derived polypeptide, product name "Promis W42" (solid content concentration=30% by mass) manufactured by SEIWA KASEI CO., LTD., which is pig skin-derived polypeptide, and product name "Promis MILK-Q" (solid content concentration=30% by mass) manufactured by SEIWA KASEI CO., LTD., which is "chlorinated N-[2-hydroxy-3-(trimethylammonio) propyl]" modified polypeptide of cationized milk-derived polypeptide were used as they were as the (B) polypeptide.

<(C) Aqueous Compound Having (Thermal Dissociative Blocked) Isocyanate Group>

In the following comparative examples and examples, product name "ELASTRON BN77" [(C-2) aqueous urethane compound having a (thermal dissociative blocked) isocyanate group, thermal dissociation temperature of blocking agent: about 160° C., pH: 8.0, solid content concentration: 31% by mass] manufactured by DKS Co. Ltd. was used as it was as the (C) aqueous compound having a (thermal dissociative blocked) isocyanate group <(D) Epoxide Compound>

In the following comparative examples and examples, product name "DENACOL EX-614B" (molecular weight: 949, epoxy equivalent: 173, solid content concentration: 100% by mass) manufactured by Nagase ChemteX Corporation, which was sorbitol polyglycidyl ether, was diluted with deionized water to prepare an aqueous solution having a solid content concentration of 10% by mass, and the aqueous solution was used for the preparation of the adhesive composition as the (D) epoxide compound.

<(E) Polyphenol>

In the following comparative examples and examples, product name "Lignin (Alkaline)" (CAS Number: 8061-51-6) manufactured by Tokyo Chemical Industry Co., Ltd. (TCI), product name "Lignin, alkali" (CAS Number: 8068-05-1) manufactured by Sigma-Aldrich Co. LLC, and product name "Mimosa" manufactured by Kawamura Trading Co., Ltd. were diluted with deionized water to prepare an aqueous solution having a solid content concentration of 10% by mass, and the aqueous solution was used for the preparation of the adhesive composition as the (E) polyphenol.

<<Preparation of Latex Adhesive Composition (Comparative Example 1)>>

The (A) rubber latex having unsaturated diene and water were mixed where the amount was adjusted so that the solid content concentration was 17% by mass, and then the mixture was sufficiently stirred to obtain a latex adhesive composition (Comparative Example 1).

<<Preparation of Latex-Aqueous Urethane Adhesive Composition (Comparative Example 2)>>

The (A) rubber latex having unsaturated diene and the (C) aqueous compound having a (thermal dissociative blocked) isocyanate group were blended as listed in Table 2 and mixed where the amount was adjusted with water so that the solid content concentration of the adhesive composition was 17% by mass, and then the mixture was sufficiently stirred to obtain a latex-aqueous urethane adhesive composition (Comparative Example 2).

<<Preparation of Latex-Epoxide Adhesive Composition (Comparative Example 3)>>

The (A) rubber latex having unsaturated diene and the (D) epoxide compound were blended as listed in Table 2 and mixed where the amount was adjusted with water so that the solid content concentration of the adhesive composition was 17% by mass, and then the mixture was sufficiently stirred to obtain a latex-epoxide adhesive composition (Comparative Example 3).

<<Preparation of Latex-Polyphenol Adhesive Composition Comparative Example 4)>>

The (A) rubber latex having unsaturated diene and the (E) polyphenol were blended as listed in Table 2 and mixed where the amount was adjusted with water so that the solid content concentration of the adhesive composition was 17% by mass, and then the mixture was sufficiently stirred to obtain a latex-polyphenol adhesive composition (Comparative Example 4).

<<Preparation of Adhesive Composition for Organic Fibers that is One Embodiment of the Present Disclosure (Examples 1 to 17)>>

As listed in Tables 2 and 3, each predetermined (A) rubber latex having unsaturated diene, (B) polypeptide, (C) aqueous compound having a (thermal dissociative blocked) isocyanate group (Examples 1, 3, 6, 9, 12, and 15), (D) epoxide compound (Examples 2, 4, 7, 10, 13, and 16), and (E) polyphenol (Examples 5, 8, 11, 14, and 17) were blended in the stated order and mixed where the amount was adjusted with water so that the solid content concentration of the adhesive composition was 17% by mass, and then the mixture was sufficiently stirred to obtain an adhesive composition for organic fibers that is one embodiment of the present disclosure (Examples 1 to 17).

<Coating of Tire Cord with Each Adhesive Composition for Organic Fibers>

Tire cords made of polyethylene terephthalate having a twist structure of 1670 dtex/2, a second twist number of 39 times/10 cm and a first twist number of 39 times/10 cm were used as organic fiber cords.

The tire cords were immersed in each of the adhesive compositions for organic fibers of Comparative Examples 1 to 4 and Examples 1 to 17, where the concentration of the adhesive composition for organic fibers impregnated in the tire cord was adjusted to 3.8% by mass with respect to the mass of the organic fiber cord. Next, they were subjected to drying in a drying zone (150° C., 60 seconds), resin heat curing with tension applied (0.8 kg/piece) in a hot zone, and heat curing with the tension released in a normalizing zone (240° C., 60 seconds) to obtain tire cords coated with each of the adhesive compositions for organic fibers of Comparative Examples 1 to 4 and Examples 1 to 17.

<Formation of Tire Cord-Rubber Composite>

The tire cords coated with each of the adhesive compositions for organic fibers of Comparative Examples 1 to 4 and Examples 1 to 17 were embedded in an unvulcanized rubber compositions and co-vulcanization was performed at 155° C. for 20 minutes.

A rubber composition containing natural rubber, styrene-butadiene rubber, carbon black, vulcanizing chemicals and the like was used as the unvulcanized rubber composition for coating.

<Evaluation of Operability of Adhesive Composition for Organic Fibers>

The operability of each of the adhesive compositions for organic fibers of Comparative Examples 1 to 4 and Examples 1 to 17 was evaluated as follows.

<<Evaluation of Mechanical Stability (Solidification Rate)>>

The mechanical stability (solidification rate) of each of the adhesive compositions for organic fibers of Comparative Examples 1 to 4 and Examples 1 to 17 was determined with a method using a Maron mechanical stability tester for copolymer latex composition described in JIS K 6392-1995 (Maron stability tester No. 2312-II, manufactured by KUMAGAI RIKI KOGYO Co., Ltd.).

In brief, each of the adhesive compositions for organic fibers of Comparative Examples 1 to 4 and Examples 1 to 17 was subjected to shear strain for 10 minutes at a compression load of 10 Kg and a rotation speed of 1000 r/min using the rotor of the Maron mechanical stability tester, and then the solidification rate % was evaluated by the following formula with the amount of formed solid products.

Solidification rate %=(dry mass of formed solid product)/(solid content mass of adhesive liquid under test)×100

A smaller value indicates better mechanical stability.

<<Evaluation of Adhesion to Drawing Roller>>

The polyethylene terephthalate tire cord, which was an organic fiber cord, was continuously treated for 2000 m in a dipping treatment machine for storing each of the adhesive compositions for organic fibers of Comparative Examples 1 to 4 and Examples 1 to 17. The amount of each of the adhesive compositions for organic fiber cords of Comparative Examples 1 to 4 and Examples 1 to 17 adhered to the drawing roller was visually observed and evaluated in the following five stages.

Extra-large: a very large amount
Large: a large amount
Medium: a medium amount
Small: a small amount
Little: a very small amount.

<Evaluation of Adhesive Property of Adhesive Composition for Organic Fibers>

The adhesive properties of each of the adhesive compositions for organic fibers of Comparative Examples 1 to 4 and Examples 1 to 17 were evaluated as follows.

<<Evaluation of Adhesiveness>>

By pulling the tire cord-rubber composites obtained by using each of the adhesive compositions for organic fibers of Comparative Examples 1 to 4 and Examples 1 to 17 at a rate of 300 mm/min, the tire cord was peeled off from the tire cord-rubber composite, and the peeling resistance per tire cord was determined and used as the adhesiveness (N/piece).

<<Evaluation of Adhesion State of Coated Rubber>>

For the tire cord peeled off from the tire cord-rubber composite, the adhesion state of the coated rubber was visually observed and scored according to Table 1 below.

TABLE 1

| Score of adhesion state of coated rubber | Adhesion area ratio of coated rubber to tire cord (organic fiber cord) | State of cord filament |
|---|---|---|
| A+ | — | Filament is broken |
| A | 80% or more and 100% or less | Filament is not broken |
| B | 60% or more and less than 80% | Filament is not broken |
| C | 40% or more and less than 60% | Filament is not broken |
| D | 20% or more and less than 40% | Filament is not broken |
| E | 0% or more and less than 20% | Filament is not broken |

<Results of Operability Evaluation and Adhesive Property Evaluation of Adhesive Composition for Organic Fibers>

The following Tables 2 and 3 list the compositions of the adhesive compositions for organic fibers of Comparative Examples 1 to 4 and Examples 1 to 17, and the operability evaluation and adhesive property evaluation results thereof.

TABLE 2

| | | Components | Comparative Example 1 | Comparative Example 2 | Comparative Example 3 | Comparative Example 4 | Example 1 | Example 2 |
|---|---|---|---|---|---|---|---|---|
| Composition of solid component of adhesive composition (% by mass) | (A) | Vinylpyridine latex *A1 | 100.0 | 63.0 | 63.0 | 63.0 | 62.5 | 62.5 |
| | (B) | Milk-derived polypeptide *B1 | — | — | — | — | 0.5 | 0.5 |
| | | Soybean-derived polypeptide *B2 | — | — | — | — | — | — |
| | | Fibroin-derived polypeptide *B3 | — | — | — | — | — | — |
| | | Fish scale-derived polypeptide *B4 | — | — | — | — | — | — |
| | | Pig skin-derived polypeptide *B5 | — | — | — | — | — | — |
| | | Trimethyl quaternary ammonium milk-derived polypeptide *B6 | — | — | — | — | — | — |
| | (C) | Aqueous urethane compound *C1 | — | 37.0 | — | — | 37.0 | — |
| | (D) | Epoxide compound *D1 | — | — | 37.0 | — | — | 37.0 |
| | (E) | Polyphenol *E1 | — | — | — | 37.0 | — | — |
| Composition of adhesive composition in solution state (% by mass) | (A) | Vinylpyridine latex *A1 | 41.46 | 26.12 | 26.12 | 26.12 | 25.91 | 25.91 |
| | (B) | Milk-derived polypeptide *B1 | — | — | — | — | 0.28 | 0.28 |
| | | Soybean-derived polypeptide *B2 | — | — | — | — | — | — |
| | | Fibroin-derived polypeptide *B3 | — | — | — | — | — | — |
| | | Fish scale-derived polypeptide *B4 | — | — | — | — | — | — |
| | | Pig skin-derived polypeptide *B5 | — | — | — | — | — | — |
| | | Trimethyl quaternary ammonium milk-derived polypeptide *B6 | — | — | — | — | — | — |

TABLE 2-continued

| | | | | | | | | |
|---|---|---|---|---|---|---|---|---|
| | (C) | Aqueous urethane compound *C1 | — | 20.29 | — | — | 20.29 | — |
| | (D) | Epoxide compound *D1 | — | — | 62.90 | — | — | 62.90 |
| | (E) | Polyphenol *E1 | — | — | — | 62.90 | — | — |
| | | Water | 58.54 | 53.59 | 10.98 | 10.98 | 53.52 | 10.91 |
| | | Solid content concentration of adhesive composition (% by mass) | 17.0 | 17.0 | 17.0 | 17.0 | 17.0 | 17.0 |
| Operability evaluation results | | Mechanical stability (%) | 4.76 | 3.75 | 5.34 | 6.42 | 1.70 | 1.55 |
| | | Adhesion to drawing roller | Extra-large | Large | Extra-large | Extra-large | Small | Small |
| Adhesive property evaluation results | | Adhesiveness (N/piece) | 4.4 | 5.4 | 7.1 | 6.0 | 13.7 | 16.2 |
| | | Adhesion state of rubber | E | E | D | E | C | B |
| | | Components | Example 3 | Example 4 | Example 5 | Example 6 | Example 7 | Example 8 |
| Composition of solid component of adhesive composition (% by mass) | (A) | Vinylpyridine latex *A1 | 62.5 | 62.5 | 62.5 | 62.5 | 62.5 | 62.5 |
| | (B) | Milk-derived polypeptide *B1 | — | — | — | — | — | — |
| | | Soybean-derived polypeptide *B2 | 0.5 | 0.5 | 0.5 | — | — | — |
| | | Fibroin-derived polypeptide *B3 | — | — | — | 0.5 | 0.5 | 0.5 |
| | | Fish scale-derived polypeptide *B4 | — | — | — | — | — | — |
| | | Pig skin-derived polypeptide *B5 | — | — | — | — | — | — |
| | | Trimethyl quaternary ammonium milk-derived polypeptide *B6 | — | — | — | — | — | — |
| | (C) | Aqueous urethane compound *C1 | 37.0 | — | — | 37.0 | — | — |
| | (D) | Epoxide compound *D1 | — | 37.0 | — | — | 37.0 | — |
| | (E) | Polyphenol *E1 | — | — | 37.0 | — | — | 37.0 |
| Composition of adhesive composition in solution state (% by mass) | (A) | Vinylpyridine latex *A1 | 25.91 | 25.91 | 25.91 | 25.91 | 25.91 | 25.91 |
| | (B) | Milk-derived polypeptide *B1 | — | — | — | — | — | — |
| | | Soybean-derived polypeptide *B2 | 0.34 | 0.34 | 0.34 | — | — | — |
| | | Fibroin-derived polypeptide *B3 | — | — | — | 1.31 | 1.31 | 1.31 |
| | | Fish scale-derived polypeptide *B4 | — | — | — | — | — | — |
| | | Pig skin-derived polypeptide *B5 | — | — | — | — | — | — |
| | | Trimethyl quaternary ammonium milk-derived polypeptide *B6 | — | — | — | — | — | — |
| | (C) | Aqueous urethane compound *C1 | 20.29 | — | — | 20.29 | — | — |
| | (D) | Epoxide compound *D1 | | 62.90 | — | — | 62.90 | — |
| | (E) | Polyphenol *E1 | — | — | 62.90 | — | — | 62.90 |
| | | Water | 53.46 | 10.85 | 10.85 | 52.49 | 9.88 | 9.88 |
| | | Solid content concentration of adhesive composition (% by mass) | 17.0 | 17.0 | 17.0 | 17.0 | 17.0 | 17.0 |
| Operability evaluation results | | Mechanical stability (%) | 0.78 | 1.44 | 1.65 | 1.10 | 1.45 | 2.48 |
| | | Adhesion to drawing roller | Small | Small | Small | Small | Small | Medium |
| Adhesive property evaluation results | | Adhesiveness (N/piece) | 12.1 | 18.1 | 11.4 | 9.9 | 15.2 | 16.2 |
| | | Adhesion state of rubber | C | A | C | C | B | B |

TABLE 3

| | | Components | Example 9 | Example 10 | Example 11 | Example 12 | Example 13 | Example 14 | Example 15 | Example 16 | Example 17 |
|---|---|---|---|---|---|---|---|---|---|---|---|
| Composition of solid component of adhesive composition (% by mass) | (A) | Vinylpyridine latex *A1 | 61.5 | 61.5 | 61.5 | 62.5 | 62.5 | 62.5 | 62.0 | 62.0 | 62.0 |
| | (B) | Milk-derived polypeptide *B1 | — | — | — | — | — | — | — | — | — |
| | | Soybean-derived polypeptide *B2 | — | — | — | — | — | — | — | — | — |
| | | Fibroin-derived polypeptide *B3 | — | — | — | — | — | — | — | — | — |
| | | Fish scale-derived polypeptide *B4 | 1.5 | 1.5 | 1.5 | — | — | — | — | — | — |
| | | Pig skin-derived polypeptide *B5 | — | — | — | 0.5 | 0.5 | 0.5 | — | — | — |
| | | Trimethyl quaternary ammonium milk-derived polypeptide *B6 | — | — | — | — | — | — | 1.0 | 1.0 | 1.0 |
| | (C) | Aqueous urethane compound *C1 | 37.0 | — | — | 37.0 | — | — | 37.0 | — | — |
| | (D) | Epoxide compound *D1 | — | 37.0 | — | — | 37.0 | — | — | 37.0 | — |
| | (E) | Polyphenol *E1 | — | — | 37.0 | — | — | 37.0 | — | — | 37.0 |
| Composition of adhesive composition in solution state (% by mass) | (A) | Vinylpyridine latex *A1 | 25.50 | 25.50 | 25.50 | 25.91 | 25.91 | 25.91 | 25.71 | 25.71 | 25.71 |
| | (B) | Milk-derived polypeptide *B1 | — | — | — | — | — | — | — | — | — |
| | | Soybean-derived polypeptide *B2 | — | — | — | — | — | — | — | — | — |
| | | Fibroin-derived polypeptide *B3 | — | — | — | — | — | — | — | — | — |
| | | Fish scale-derived polypeptide *B4 | 1.28 | 1.28 | 1.28 | — | — | — | — | — | — |
| | | Pig skin-derived polypeptide *B5 | — | — | — | 0.28 | 0.28 | 0.28 | — | — | — |
| | | Trimethyl quaternary ammonium milk-derived polypeptide *B6 | — | — | — | — | — | — | 0.57 | 0.57 | 0.57 |
| | (C) | Aqueous urethane compound *C1 | 20.29 | — | — | 20.29 | — | — | 20.29 | — | — |
| | (D) | Epoxide compound *D1 | — | 62.90 | — | — | 62.90 | — | — | 62.90 | — |
| | (E) | Polyphenol *E1 | — | — | 62.90 | — | — | 62.90 | — | — | 62.90 |
| | | Water | 52.93 | 10.32 | 10.32 | 53.52 | 10.91 | 10.91 | 53.43 | 10.82 | 10.82 |
| | | Solid content concentration of adhesive composition (% by mass) | 17.0 | 17.0 | 17.0 | 17.0 | 17.0 | 17.0 | 17.0 | 17.0 | 17.0 |

TABLE 3-continued

| | Components | Example 9 | Example 10 | Example 11 | Example 12 | Example 13 | Example 14 | Example 15 | Example 16 | Example 17 |
|---|---|---|---|---|---|---|---|---|---|---|
| Operability evaluation results | Mechanical stability (%) | 0.98 | 1.05 | 2.32 | 0.45 | 0.59 | 1.10 | 0.93 | 1.56 | 1.34 |
| | Adhesion to drawing roller | Small | Small | Small | Little | Little | Small | Little | Small | Little |
| Adhesive property evaluation results | Adhesiveness (N/piece) | 14.0 | 15.1 | 9.0 | 12.2 | 15.2 | 13.4 | 17.5 | 17.7 | 15.3 |
| | Adhesion state of rubber | B | B | D | B | B | B | A | A | B |

<Each Column of the Adhesive Composition>

A1: Vinylpyridine latex, vinylpyridine-styrene-butadiene copolymer latex synthesized with the above method, solid content concentration=41% by mass B1: Milk-derived polypeptide, manufactured by SEIWA KASEI CO., LTD., product name “Promis HYDOROMILK”, number average molecular weight=600, solid content concentration=30% by mass B2: Soybean-derived polypeptide, manufactured by SEIWA KASEI CO., LTD., product name “Promis WS-HF”, number average molecular weight=700, solid content concentration=25% by mass B3: Fibroin-derived polypeptide, manufactured by SEIWA KASEI CO., LTD., product name “Promis Silk-1000F”, number average molecular weight=1000, solid content concentration=6.5% by mass B4: Fish scale-derived polypeptide, manufactured by SEIWA KASEI CO., LTD., product name “Promis W32-U”, number average molecular weight=400, solid content concentration=20% by mass B5: Pig skin-derived polypeptide, manufactured by SEIWA KASEI CO., LTD., product name “Promis W42”, number average molecular weight=1000, solid content concentration=30% by mass B6: Trimethyl quaternary ammonium milk-derived polypeptide, manufactured by SEIWA KASEI CO., LTD., product name “Promis MILK-Q”, number average molecular weight=800, solid content concentration=30% by mass C1: Aqueous urethane compound, manufactured by DKS Co. Ltd., product name “ELASTRON BN77” (F-2955D-1), aqueous urethane compound having a (thermal dissociative blocked) isocyanate group, thermal dissociation temperature of blocking agent: about 160° C., pH: 8.0, solid content concentration=31% by mass D1: Epoxide compound, sorbitol polyglycidyl ether, manufactured by Nagase ChemteX Corporation, product name “DENACOL EX-614B”, molecular weight=949, epoxy equivalent=173, used as an aqueous solution with a solid content concentration of 10% by mass E1: Polyphenol, manufactured by Tokyo Chemical Industry Co., Ltd. (TCI), product name “Lignin (Alkaline), solid content concentration=10% by mass Tables 2 and 3 indicate that an adhesive composition containing (A) rubber latex having unsaturated diene and (B) polypeptide, and at least one of (C) an aqueous compound having a (thermal dissociative blocked) isocyanate group, (D) an epoxide compound and (E) polyphenol has good operability and good adhesion between an organic fiber and a coated rubber composition.

INDUSTRIAL APPLICABILITY

This disclosure provides an adhesive composition for organic fibers having the following effects:

(1) causing little damage to the environment by using no resorcin, (2) in a process of coating an organic fiber with the adhesive composition for organic fibers and drying and heat curing, it is possible to suppress the adhesion of the adhesive composition for organic fibers to a roller or the like by suppressing the adhesiveness of rubber latex, which is measured as the mechanical stability of the adhesive liquid under shear strain, thereby achieving good operability, and (3) achieving good adhesion between an organic fiber and a coated rubber composition.

It also provides an organic fiber-rubber composite using an organic fiber coated with the adhesive composition for organic fibers, and a tire using the organic fiber-rubber composite. Therefore, the present disclosure can be used in the industrial fields of manufacturing rubber articles such as tires.

REFERENCE SIGNS LIST

1 organic fiber cord
2 adhesive composition for organic fibers
3 dipping bath (dipping tank)
4 organic fiber cord coated with the adhesive composition for organic fibers
5 drawing roller
6 drying zone
7 hot zone
8 normalizing zone
11 rubber latex having unsaturated diene
12 polypeptide
13 urethane resin formed by aqueous urethane compound having a (thermal dissociative blocked) isocyanate group
14 activated isocyanate group
15 part that easily interacts with an organic fiber
16 part that is difficult to diffuse into an organic fiber
20 latex-polypeptide protective film effect
21 rubber co-vulcanized adhesive
22 polypeptide-isocyanate cross-link
23 activated isocyanate cross-link
24 aqueous urethane-organic fiber interface effect
31 organic fiber-rubber composite
32 adhesive layer of adhesive composition for organic fibers
33 coated rubber composition
40 water-dispersible (thermal dissociative blocked) isocyanate compound that is an addition product of polyisocyanate having an aromatic ring and a blocking agent having one or more active hydrogen groups
41 aromatic isocyanate-organic fiber diffusion effect

The invention claimed is:

1. An adhesive composition for organic fibers comprising
(A) rubber latex having unsaturated diene,
(B) polypeptide, and
a compound selected from the group consisting of: (C) an aqueous compound having a thermal dissociative blocked isocyanate group; and a combination of the (C) aqueous compound and (E) polyphenol, wherein
the (B) polypeptide is polypeptide obtained by hydrolysis of proteins, the (B) polypeptide having a number average molecular weight of 300 to 8,000,
the (C) aqueous compound is (C-2) an aqueous urethane compound having the thermal dissociative blocked isocyanate group,
the (C-2) aqueous urethane compound is a reaction product obtained by mixing and reacting (α), (β), (γ) and (δ), where:
(α) is an organic polyisocyanate compound having 3 or more and 5 or less functional groups and having a number average molecular weight of 2,000 or less;
(β) is a compound having 2 or more and 4 or less active hydrogen groups and a number average molecular weight of 5,000 or less;
(γ) is a thermal dissociative blocking agent; and
(δ) is a compound having at least one active hydrogen group and at least one anionic, cationic, or nonionic hydrophilic group,
(α), (β), (γ) and (δ) are mixed so that:
a mixing ratio of (α) is 40% by mass or more and 85% by mass or less;
a mixing ratio of (β) is 5% by mass or more and 35% by mass or less;
a mixing ratio of (γ) is 5% by mass or more and 35% by mass or less; and
a mixing ratio of (δ) is 5% by mass or more and 35% by mass or less, each with respect to the total amount of (α), (β), (γ) and (δ),
when an isocyanate group (—NCO) has a molecular weight of 42, a composition ratio of the thermal dissociative blocked isocyanate group in the reaction product is 0.5% by mass or more and 11% by mass or less,
the (E) polyphenol is a plant-derived compound having a plurality of phenolic hydroxy groups in a molecule, and the adhesive composition for organic fibers contains no resorcin.

2. The adhesive composition for organic fibers according to claim 1, wherein the (C-2) aqueous urethane compound is represented by the following general formula (1),

[Chem. 1]

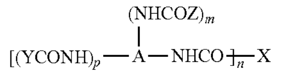
(1)

where
A is a residue of an organic polyisocyanate compound from which an active hydrogen group has been eliminated,
X is a residue of a polyol compound having 2 or more and 4 or less hydroxyl groups and having a number average molecular weight of 5,000 or less from which an active hydrogen group has been eliminated,
Y is a residue of a thermal dissociative blocking agent from which an active hydrogen group has been eliminated,
Z is a residue of a compound having at least one active hydrogen group and a group that produces at least one salt or a hydrophilic polyether chain, from which an active hydrogen group has been eliminated,
n is an integer of 2 or more and 4 or less, and
p+m is an integer of 2 or more and 4 or less, where $m \geq 0.25$.

3. The adhesive composition for organic fibers according to claim 1, wherein the (E) polyphenol is lignin or a derivative thereof.

4. An organic fiber-rubber composite using an organic fiber coated with the adhesive composition for organic fiber according to claim 1.

5. An organic fiber cord-rubber composite using an organic fiber cord coated with the adhesive composition for organic fiber according to claim 1.

6. A tire using the organic fiber-rubber composite according to claim 4.

* * * * *